US011746011B2

(12) United States Patent
O'Neal et al.

(10) Patent No.: US 11,746,011 B2
(45) Date of Patent: *Sep. 5, 2023

(54) REVERSE FLOW REACTORS WITH SELECTIVE FLUE GAS CASCADE

(71) Applicant: ExxonMobil Technology and Engineering Company, Annandale, NJ (US)

(72) Inventors: Everett J. O'Neal, Asbury, NJ (US); Anastasios I. Skoulidas, Pittstown, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 637 days.

This patent is subject to a terminal disclaimer.

(21) Appl. No.: 16/838,477

(22) Filed: Apr. 2, 2020

(65) Prior Publication Data
US 2020/0339417 A1 Oct. 29, 2020

Related U.S. Application Data

(60) Provisional application No. 62/837,923, filed on Apr. 24, 2019.

(51) Int. Cl.
*C01B 3/38* (2006.01)
*B01J 8/04* (2006.01)
(Continued)

(52) U.S. Cl.
CPC ............ *C01B 3/38* (2013.01); *B01J 8/0438* (2013.01); *B01J 19/0013* (2013.01);
(Continued)

(58) Field of Classification Search
CPC ............ C01B 3/38; C01B 2203/0233; C01B 2203/0811; C01B 2203/1241;
(Continued)

(56) References Cited

U.S. PATENT DOCUMENTS 6,159,395 A 12/2000 Early et al.
7,491,250 B2 2/2009 Hershkowitz et al.
(Continued)

OTHER PUBLICATIONS

Kolios, et al.; "Heat-Integrated Reactor Concepts for Catalytic Reforming and Automotive Exhaust Purification", Applied Catalysis B: Environmental, 2006, vol. 70, pp. 16-30.
(Continued)

*Primary Examiner* — Douglas B Call
(74) *Attorney, Agent, or Firm* — Shook, Hardy & Bacon L.L.P.

(57) ABSTRACT

Systems and methods are provided for improving the operation of groups of reverse flow reactors by operating reactors in a regeneration portion of the reaction cycle to have improved flue gas management. The flue gas from reactor(s) at a later portion of the regeneration step can be selectively used for recycle back to the reactors as a diluent/heat transport fluid. The flue gas from a reactor earlier in a regeneration step can be preferentially used as the gas vented from the system to maintain the desired volume of gas within the system. This results in preferential use of higher temperature flue gas for recycle and lower temperature flue gas for venting from the system. This improved use of flue gas within a reaction system including reverse flow reactors can allow for improved reaction performance while reducing or minimizing heat losses during the regeneration portion of the reaction cycle.

16 Claims, 13 Drawing Sheets

(51) Int. Cl.
*B01J 19/00* (2006.01)
*B01J 19/24* (2006.01)

(52) U.S. Cl.
CPC .. *B01J 19/2445* (2013.01); *B01J 2219/00038* (2013.01); *B01J 2219/00157* (2013.01); *C01B 2203/0233* (2013.01); *C01B 2203/0811* (2013.01); *C01B 2203/1241* (2013.01)

(58) Field of Classification Search
CPC .. B01J 8/0438; B01J 19/0013; B01J 19/2445; B01J 2219/00038; B01J 2219/00157
USPC .......................................................... 252/373
See application file for complete search history.

(56) References Cited

U.S. PATENT DOCUMENTS

| | | | |
|---|---|---|---|
| 7,740,289 | B2 | 1/2010 | Tang |
| 7,740,829 | B2 | 6/2010 | Becker et al. |
| 7,815,873 | B2 | 10/2010 | Sankaranarayanan et al. |
| 8,754,276 | B2 | 1/2014 | Buchanan et al. |
| 2003/0235529 | A1* | 12/2003 | Hershkowitz ........ B01J 19/2485 423/652 |
| 2012/0111315 | A1 | 5/2012 | Grenda et al. |
| 2017/0137285 | A1 | 5/2017 | Ide et al. |
| 2019/0055178 | A1 | 2/2019 | Weiss et al. |

OTHER PUBLICATIONS

The International Search Report and Written Opinion for PCT/US2020/026359 dated Oct. 8, 2020.

* cited by examiner

REVERSE FLOW REACTORS WITH SELECTIVE FLUE GAS CASCADE

CROSS REFERENCE TO RELATED APPLICATION

This application claims priority to U.S. Provisional Application Ser. No. 62/837,923 filed Apr. 24, 2019, which is herein incorporated by reference in its entirety.

FIELD OF THE INVENTION

This invention relates to management of flue gas flow during operation of reverse flow reactors.

BACKGROUND OF THE INVENTION

Reverse flow reactors are an example of a reactor type that is beneficial for use in processes with cyclic reaction conditions. For example, due to the endothermic nature of reforming reactions, additional heat needs to be introduced on a consistent basis into the reforming reaction environment. Reverse flow reactors can provide an efficient way to introduce heat into the reaction environment. After a portion of the reaction cycle used for reforming or another endothermic reaction, a second portion of the reaction cycle can be used for combustion or another exothermic reaction to add heat to the reaction environment in preparation for the next reforming step. U.S. Pat. Nos. 7,815,873 and 8,754,276 provide examples of using reverse flow reactors to perform various endothermic processes in a cyclic reaction environment.

U.S. Pat. No. 7,740,289 describes production of synthesis gas in a reverse flow reactor by steam reforming followed by incomplete combustion of remaining hydrocarbons at elevated temperature and pressure. In addition to providing additional synthesis gas, the incomplete combustion provides heat to the reactor. In the method described in U.S. Pat. No. 7,740,289, the reversal of flow is achieved by alternating the end of the reactor used for input of the reactant flows for performing the steam reforming and incomplete combustion. The resulting synthesis gas can then be used for production of methanol.

U.S. Patent Application Publication 2012/0111315 describes an in-situ vaporizer and recuperator that is suitable for use with an alternating flow system, such as a pressure swing reformer.

SUMMARY

In an aspect, a method for operating a plurality of reactors is provided. The method includes reacting a first mixture comprising fuel and 0.1 vol % or more of $O_2$ under first combustion conditions in a first combustion zone within a first reactor. The reacting can result in formation of a first flue gas comprising a first temperature of 400° C. or more and heating one or more surfaces in a first reaction zone to a regenerated surface temperature of 800° C. or more. The first reaction zone can include a catalyst composition. At least a portion of the first flue gas can be passed into a second reactor. Optionally, the at least a portion of the first flue gas can be cascaded into the second reactor. Additionally or alternatively, the first combustion conditions can include a pressure that is at least 100 kPa greater than a pressure associated with second combustion conditions in the second reactor. The method can further include reacting a second mixture comprising fuel, 0.1 vol % or more of $O_2$, and the at least a portion of the first flue gas under second combustion conditions in a second combustion zone within the second reactor. The reaction can result in formation of a second flue gas having a temperature of between 200° C. to the first temperature and heating one or more surfaces in a second reaction zone. A first reactant stream can then be exposed to the one or more surfaces in the first reaction zone to increase the temperature of the first reactant stream. The first reactant stream can then be exposed to the catalyst composition in the first reaction zone at a temperature of 800° C. or more to form a first product stream. A direction of flow for the first reactant stream within the first reaction zone can be reversed relative to a direction of flow for the first mixture.

In another aspect, a system comprising a plurality of reverse flow reactors is provided. The system can include a first reverse flow reactor comprising a first recycle gas inlet and a first flue gas outlet. The system can further include one or more second reverse flow reactors comprising one or more second recycle gas inlets and one or more second flue gas outlets. The one or more second recycle gas inlets can be in direct fluid communication with the first flue gas outlet. The first recycle gas inlet can be in indirect fluid communication with at least one second recycle gas outlet.

DETAILED DESCRIPTION

Figure 1:
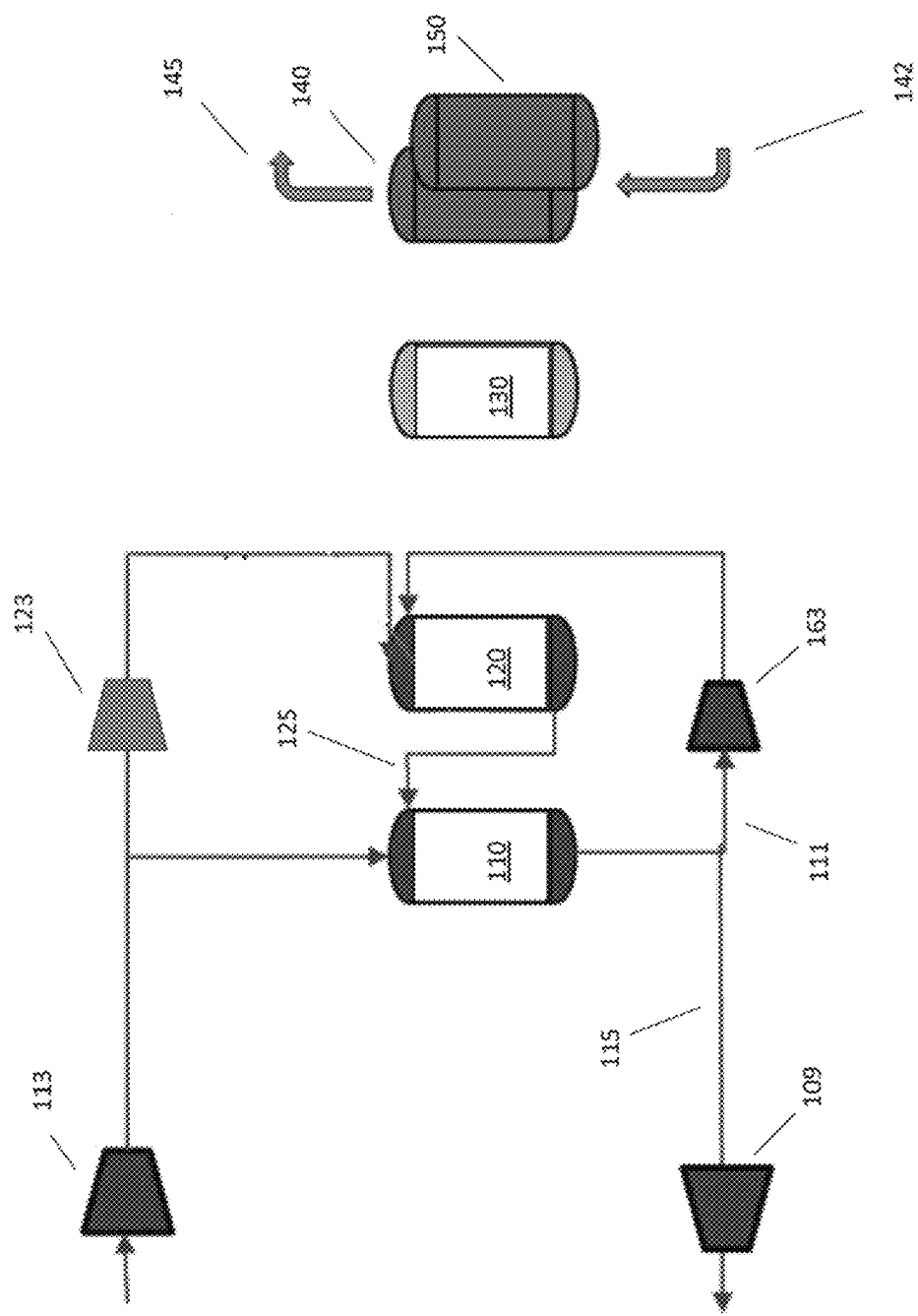
FIG. 1 shows an example of a configuration for cascading of flue gas from a higher pressure reverse flow reactor to a lower pressure reverse flow reactor.

All numerical values within the detailed description and the claims herein are modified by "about" or "approximately" the indicated value, and take into account experimental error and variations that would be expected by a person having ordinary skill in the art.

Overview

In various aspects, systems and methods are provided for improving the operation of groups of reverse flow reactors when operating in a manner to provide a continuous or semi-continuous flow of output. In such aspects, where a plurality of reactors are used to allow for different reactors to be in different stages of a reaction cycle, the reactors in a regeneration portion of the reaction cycle can be operated to have improved flue gas management. For example, reactors toward the end of regeneration can have a higher flue gas exhaust temperature than reactors earlier in the regeneration step. The flue gas from reactor(s) at a later portion of the regeneration step can be selectively used for recycle back to the reactors as a diluent/heat transport fluid. The flue gas from a reactor earlier in a regeneration step can be preferentially used as the gas vented from the system to maintain the desired volume of gas within the system. This improved use of flue gas within a reaction system including reverse flow reactors can allow for improved reaction performance while reducing or minimizing heat losses during the regeneration portion of the reaction cycle.

Reverse flow reactors and/or other reactors with flows in opposite directions at different stages of a reaction cycle can be useful when performing endothermic reactions at elevated temperatures. Examples of elevated temperatures correspond to 600° C. or more, or 800° C. or more, such as up to 1600° C. or possibly still higher. A flow from a first direction, corresponding to a combustion or regeneration flow, can be used to heat a reaction zone within the reactor to a desired temperature. The reagents for a desired reaction can then be passed in using a flow in the opposite direction. The heat stored within the reaction zone of the reactor during the regeneration step is used to provide heat for the desired endothermic reaction.

One of the challenges in operating a reverse flow reactor is managing the introduction of heat during the regeneration step. Introducing a larger amount of heat into the reactor during the regeneration step can allow for an increased amount of the corresponding endothermic reaction during the reaction step. However, the amount of heat that can be introduced is constrained by the need to avoid excessive temperature spikes in localized areas. For example, performing too much combustion at a single location could result in exceeding a maximum temperature for the structural materials and/or internal components of the reactor.

In order to overcome this difficulty, a diluent gas can be introduced during the regeneration step. The reactor can also be pressurized during regeneration to increase the amount of diluent gas per unit volume. In some aspects, the diluent gas corresponds to nitrogen or a composition that is substantially composed of nitrogen (i.e., air). The diluent gas absorbs a portion of the heat generated during combustion and carries the heat to downstream locations within the reactor (relative to the direction of flow in the regeneration step). Thus, the diluent can act as a heat transport fluid. This can allow additional heat to be introduced into the reactor while reducing the maximum temperature at any location. While adding a diluent to the input flow during regeneration can be effective for creating a broader high temperature reaction zone, the diluent and combustion products retain at least some heat as they exit from the reactor. The diluent and combustion products are exhausted from the reactor as a flue gas.

It has been discovered that a substantial portion of the waste heat in a reverse flow reactor system is lost due to exhaust of flue gas during regeneration of the reactor(s). However, it is difficult to fully recover the heat energy from the flue gas exhausted from such flue gas. As the temperature increases, the amount of waste heat can increase rapidly. For example, in a conventional reverse flow reactor configuration, increasing the exit temperature for the flue gas during regeneration from 300° C. to 400° C. can result in a roughly 20% increase in the amount of waste energy that is lost from the system.

Although higher flue gas exit temperatures result in additional loss of waste energy, higher temperatures can also provide substantial benefits for the endothermic reaction performed in the reverse flow reactor. These benefits can include, but are not limited to, improved reaction kinetics for the endothermic reaction; increased product yields; increased single pass conversion of reactants; improved selectivity for desired products; and/or other possible benefits. For example, when performing steam reforming, increasing the exit temperature of the reactor during regeneration can allow for a substantial increase in conversion of methane (or other hydrocarbons) to the desired syngas product.

Based on the above, it would be desirable to develop systems and methods that can allow for the improved reaction benefits of having a higher flue gas exhaust temperature while also achieving the reduced energy costs of having a lower flue gas exhaust temperature.

It has been discovered that the difficulties with loss of waste heat from a reaction system including reverse flow reactors can be reduced or minimized by improving the management of flue gas within a reaction system. This can be achieved, for example, by at least partially segregating flue gas from reactors at later stages of regeneration from flue gas exhausted from reactors at earlier stages of regeneration. This (at least partial) segregation can allow flue gas at higher temperatures to be preferentially used as the recycle gas/heat transport fluid in the reaction system. By preferentially using higher temperature flue gas for recycle, any flue gas that is passed out of the reaction system can substantially correspond to lower temperature flue gas. This is in contrast to conventional configurations, where the flue gas from reactors at various stages of regeneration may be mixed together prior to recycle or passage out of the reaction system.

The segregation of higher temperature flue gas and lower temperature flue gas can be observed based on the ratio of flue gas from various reactors that is used for recycle. The benefits of segregation can be observed based on selective use of high temperature flue gas as heat transfer fluid into a single reactor, or based on selective use of high temperature flue gas to a plurality of reactors (such as up to all reactors in a regeneration portion of the reaction cycle). When high temperature flue gas is segregated for delivery to a plurality of reactors, a volume ratio of high temperature flue gas to low temperature flow gas delivered to the plurality of reactors can be 1.5 or more, or 2.0 or more, or 3.0 or more, or 5.0 or more, such as up to having substantially all of the flue gas correspond to high temperature flue gas. When high temperature flue gas from one reactor is segregated for delivery to another single reactor (such as by cascade), a volume ratio of high temperature flue gas to low temperature flow gas delivered to the plurality of reactors can be 3.0 or more, or 5.0 or more, or 8.0 or more, such as up to having substantially all of the flue gas correspond to high temperature flue gas.

By segregating the flue gas flows, the advantages of high temperature operation can be realized while reducing or minimizing the amount of waste heat. Allowing the regeneration step to complete at an increased temperature flue gas exhaust temperature can provide reactivity benefits. By selectively using the resulting high temperature flue gas for recycle to other reactors that are earlier in the regeneration step, the flue gas passed out of the system substantially corresponds to lower temperature flue gas, thus reducing or minimizing energy waste.

Based on segregation of higher temperature and lower temperature flue gas, energy use in the reverse flow reactors can be reduced while maintaining similar operation. Alternatively, the maximum exit temperature of flue gas from the reactors can be increased while maintaining similar energy usage. Increasing the maximum exit temperature of the flue gas can allow for higher temperature operation and/or increased flow through the reactor, resulting in benefits such as better kinetics for a desired reaction, increased yields, and/or other benefits from higher temperature operation. More generally, any convenient combination of the benefits of reduced energy usage and/or improved operation of the reaction can be selected.

In this discussion, unless otherwise specified, description of temperatures within the reaction zone corresponds to temperatures measured at the location where the maximum temperature occurs in the reaction zone at the end of the regeneration step. The location of the maximum temperature in the reaction zone at the end of the regeneration step is typically at or near the boundary between the reaction zone and the recuperation zone. The boundary between the reaction zone and the recuperation zone is defined as the location where the catalyst for the endothermic reaction begins in the reactor.

In this discussion, unless otherwise specified, all volume ratios correspond to volume ratios where the quantities in the ratio are specified based on volume at standard temperature and pressure (20° C., 100 kPa). This allows volume ratios to be specified consistently even though two flue gas volumes being compared may exist at different temperatures and pressures. When a volume ratio is specified for flue gases being delivered into a reactor, the corresponding flow rate of gas for a unit time under standard conditions can be used for the comparison.

Configuration Example—High Pressure to Low Pressure Cascade

One option for segregating high temperature flue gas can be to use a cascade configuration, so that substantially all of the flue gas generated at high temperature by regeneration is passed into a reactor that is in an earlier stage of regeneration. This can be achieved, for example, by performing later portions of regeneration at a higher pressure. The resulting higher pressure flue gas can then be passed into a lower pressure reactor without requiring additional compression.

Figure 2:
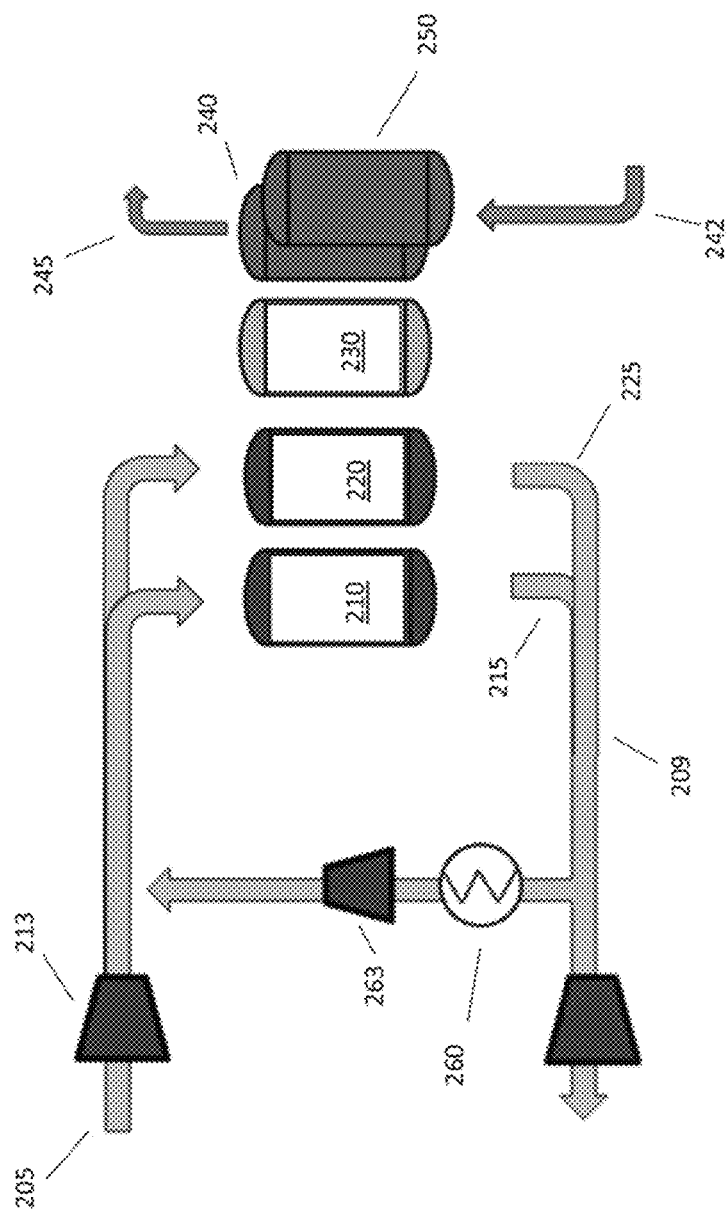
FIG. 2 shows an example of a configuration for using a plurality of reverse flow reactors to perform hydrocarbon reforming.

FIG. 2 shows an example of a reaction system including multiple reverse flow reactors. Although a total of five reactors are shown in FIG. 2 (and in various other figures), it is understood that any convenient number of reactors can be used. By using multiple reactors, a continuous or substantially continuous stream of reaction product can be provided as input to downstream parts of a refinery, chemical plant, or other facility.

In FIG. 2, reactors 210 and 220 correspond to reactors in the regeneration portion of the reaction cycle. Reactors 240 and 250 correspond to reactors in the endothermic reaction portion of the reaction cycle. For example, reactors 240 and 250 can perform steam reforming, where an input stream 242 of steam and methane (and/or other reformable organics) is converted to a synthesis gas product 245. Reactor 230 corresponds to a reactor that is in-between the regeneration and reaction portions of the cycle. Depending on the length of each portion of the cycle, reactor 230 can alternatively correspond to another reactor in the regeneration portion of the cycle or another reactor in the reaction portion of the cycle. It is understood that the representation in FIG. 2 corresponds to a snapshot of the system at a given point in time. As time progresses, the individual reactors will progress from reaction to regeneration and back again to reaction.

In FIG. 2, reactors 210 and 220 are at different stages of regeneration. Reactor 210 is at an earlier stage of regeneration, while reactor 220 is at a later stage. During regeneration, the flue gas exhausted from a reactor is initially at a lower temperature. As regeneration progresses, the temperature of the flue gas increases. Thus, a reactor at a later stage of regeneration can exhaust a flue gas having a higher flue gas temperature, such as a flue gas having a temperature of 350° C. or more, or 400° C. or more, or 450° C. or more, or 500° C. or more, such as up to 700° C. or possibly higher. By contrast, a reactor at an earlier stage of regeneration can have a flue gas exhaust temperature of less than 500° C., or less than 450° C., or less than 400° C., or less than 350° C., such as down to 170° C., or down to 200° C.

In the configuration shown in FIG. 2, reactor 210 and reactor 220 are operated at the same pressure. Compressor 213 can be used to increase the fuel and oxidant feed 205 to the pressure used for both reactors.

In addition to fuel and oxidant feed 205, reactors in regeneration also receive flue gas as a heat transfer fluid. In the configuration shown in FIG. 2, the flue gas 215 from reactor 210 and flue gas 225 from reactor 220 are mixed to form a common flue gas stream 209. The majority of common flue gas stream 209 is passed through a heat recovery stage, such as a waste heat boiler 260, followed by compression 263 to increase the recycled flue gas to the same pressure as fuel and oxidant feed 205. The remaining portion of flue gas stream 209 is passed out of the reaction system, in order to maintain a desired level of gas within the reaction system.

It has been discovered that improvements in fuel usage and/or reaction kinetics can be achieved by modifying how flue gas is recycled to the reactors in regeneration. One example of an improved configuration can be to cascade flue gas from reactor(s) at a later stage of regeneration to reactor(s) at an earlier stage of regeneration. By cascading the higher temperature flue gas to another reactor in regeneration, the higher temperature flue gas can preferentially be used to further heat a reactor in regeneration. In order to perform the cascade, the reactor including the higher temperature flue gas can be regenerated at a higher pressure. For example, the pressure of the reactor in the higher temperature portion of the regeneration cycle can be greater than the pressure of the reactor in the lower temperature portion of the regeneration cycle by 100 kPa or more, or 150 kPa or more, or 200 kPa or more. Any convenient pressure differential would be fine, such as up to 1500 kPa or possibly still more, but still higher pressure differentials may have lower overall efficiency due to the pressure drop. The flue gas passed out of the reaction system can be drawn from the remaining lower temperature flue gas, thus reducing or minimizing the amount of heat lost or wasted.

FIG. 1 shows an example of a configuration where flue gas is cascaded from a reactor 120 at a later stage of regeneration to a reactor 110 at an earlier stage of regeneration. In the configuration shown in FIG. 1, reactor 110 is operated at a different pressure than reactor 120. For example, reactor 110 can be operated at a first pressure (such as 10 bar or ~1000 kPa-g) while reactor 120 can be operated at a second, higher pressure (such as 12 bar or ~1200 kPa-g). The pressure differential between reactors 110 and 120 can be maintained in part based on a supplemental compressor. For example, primary compressor 113 can be used to increase the fuel and oxidant feed 105 to the first pressure used for reactors in early stages of regeneration. Supplemental compressor 123 can be used to further increase the fuel and oxidant feed 105 to the second pressure for reactors in later stages of regeneration. In various aspects, the pressure differential between cascaded reactors can be 100 kPa or more, or 150 kPa or more, or 200 kPa or more. Similar to FIG. 2, reactor 130 is in an idle phase. Reactors 140 and 150 are in the reaction step for conversion of hydrocarbon-containing feed 142 into synthesis gas 145.

Instead of forming a common flue gas stream, in the configuration in FIG. 1, flue gas 125 from reactor 120 is cascaded into reactor 110. In some aspects, the pressure differential between reactor 120 and reactor 110 can be sufficiently great so that no additional compression is needed to pass flue gas 125 into reactor 110. Flue gas 115 from reactor 110 can be divided into at least two portions. A first portion 111 can be compressed 163 prior to recycling into reactor 120. A remaining portion 109 can be passed out of the reaction system.

It is noted that the cascade of flue gas from reactor 120 to reactor 110 in FIG. 1 corresponds to direct fluid communication between reactor 120 and reactor 110. This is defined as fluid communication between two process elements without an intervening process element that substantially alters the pressure, temperature, or composition of the fluid. In this discussion, substantial alteration of the pressure corresponds to a change in pressure of 20 kPa or more, while substantial alteration of temperature corresponds to a temperature change of 10° C. or more.

Figure 3:
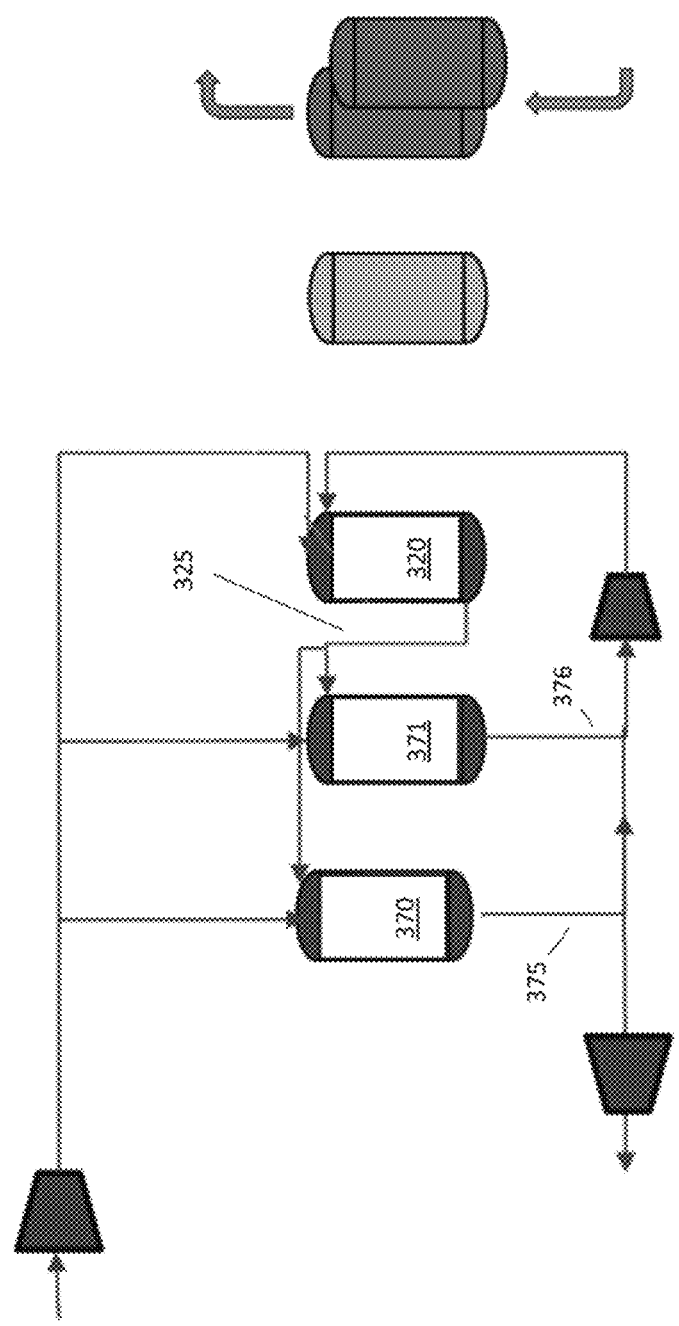
FIG. 3 shows another example of a configuration for cascading of flue gas from a higher pressure reverse flow reactor to a lower pressure reverse flow reactor.

FIG. 3 shows another configuration for cascading of flue gas from a higher pressure reactor to a lower pressure reactor. In FIG. 3, the flue gas 325 from reactor 320 is cascaded to both reactor 370 and reactor 371. Reactor 370 can be at an early portion of the regeneration step, such as having a flue gas exit temperature of less than 300° C., while reactor 371 can have a flue gas exit temperature between 300° C. and 400° C. In some aspects, the gas flow in a later stage of regeneration can be greater than the gas flow in an earlier stage of regeneration. Having different gas flows at different portions of regeneration can improve thermal efficiency while also providing flexibility for design of a reaction system.

In the example shown in FIG. 3, the flow into reactor 320 is roughly twice the flow into reactors 370 and 371. This can allow flue gas 325 to be split for cascading into both reactor 370 and reactor 371. In the configuration shown in FIG. 3, flue gas 375 and flue gas 376 are shown as being passed into a common conduit for either recycle or exit from the system. Optionally, flue gas 376 can be preferentially used for recycle to reactor 320 (after compression) while any flue gas that exits the system can preferentially be drawn from flue gas 375.

Configuration Example—Selector Valves

Another option for segregating high temperature flue gas can be to use a configuration with selector valves. The selector valves can be used to divert flue gas from a regenerating reactor for a desired use, so that substantially all of the flue gas generated at high temperature by regeneration is passed into a reactor that is in an earlier stage of regeneration.

Figure 4:
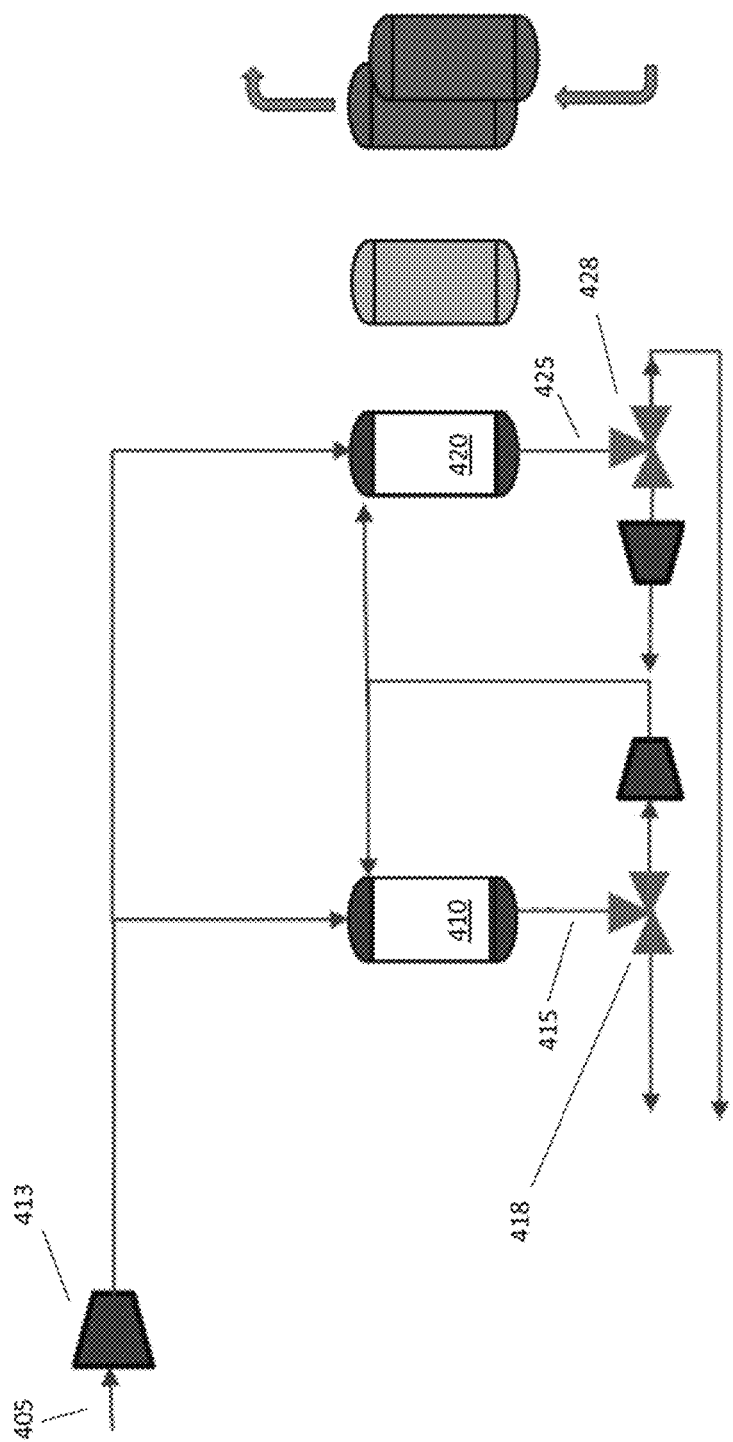
FIG. 4 shows an example of a configuration for selecting flue gas flows for use as recycle streams to reverse flow reactors.

FIG. 4 shows an example of a configuration using valves to control the flow of flue gas from a plurality of reactors in a regeneration step. In FIG. 4, reactor 410 and reactor 420 can (optionally) be operated at the same or similar pressures. This can allow compressor 413 to be used to increase the fuel and oxidant feed 405 to the pressure used for both reactors.

In FIG. 4, selector valve 418 controls the direction of flow for flue gas 415. Similarly, selector valve 428 controls the direction of flow for flue gas 425. Depending on the flue gas with a higher temperature, selector valve 418 and selector valve 428 can be used to recycle flue gas back to the reactors as a heat transport fluid or to pass portions of the flue gas out of the system. It is noted that the amount of flue gas passed out of the reaction system may be smaller than the flue gas flow from a reactor. Thus, in some aspects, the selector valve for a lower temperature reactor can divert a portion of the flue gas for recycle while diverting another portion of exit from the reaction system.

Depending on the aspect, the valve position for the selector valves (recycle, exit from the system) can be set in any convenient manner. One option can be to set the valve position based on time. The length of a reaction plus regeneration cycle can stay relatively constant during operation, so the time periods when a flue gas corresponds to a "hot" flue gas versus a "cold" flue gas are therefore known in advance. Another option could be to detect the temperature of flue gas streams and switch the valve positions based on the relative temperatures.

Figure 5:
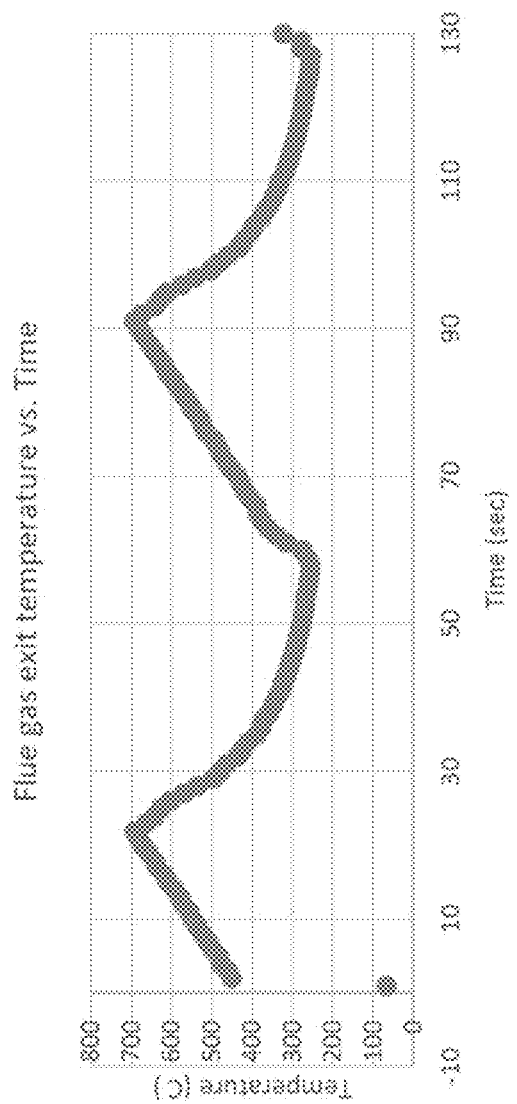
FIG. 5 shows a temperature profile for gas exhausted from a reverse flow reactor during a reforming cycle.

FIG. 5 shows an example of the exit temperature profile for gases exhausted from a reverse flow reactor that was used for steam reforming. In the example shown in FIG. 5, the temperature for gases exhausted from the reactor during both the reaction step and the regeneration step are shown. The regeneration step corresponds to the portions of FIG. 5 where the flue gas temperature is increasing.

As shown in FIG. 5, the flue gas exit temperature during regeneration varied from a low temperature around 200° C. to a high temperature around 700° C. One option for managing flue gas having the temperature profile in FIG. 5 would be to use the flue gas generated between 60 seconds and 75 seconds as "low temperature" flue gas, and the flue gas generated between 75 seconds and 90 seconds as "high temperature" flue gas. This would correspond to using flue gas with temperatures between 200° C. and 500° C. as "low temperature" flue gas, and flue gas with temperatures between 500° C. and 700° C. as "high temperature" flue gas.

Configuration Example—Ring Manifold with Valves

Still another option for segregating high temperature flue gas from low temperature flue gas can be based on use of a manifold and valves to allow for control of the direction of gas flow in the manifold. In this type of option, a valve associated with each reactor and/or the manifold connection to each reactor can allow or prevent fluid communication between a reactor and the manifold. This type of valve can be closed, for example, while a reactor is in the reaction step and then opened when the regeneration step starts. The manifold can also have exit locations for gas that is to be passed to the recycle compressor for recycle to the reactors, and for gas that is to be passed through an expander to recover energy from the gas prior to leaving the reaction system.

In addition to the valves to control fluid communication between each reactor and the manifold, additional valves can be used to control the direction of fluid (gas) flow within the manifold. For example, the manifold can be organized in a ring or other closed loop/continuous configuration, so that when all manifold valves are open, fluid communication is available between all points in the manifold in either direction of flow. At least two valves can then be used to control fluid flow within the manifold. By selectively opening and closing the at least two valves, the distance of the available fluid flow path for each reactor to the two exit locations can be controlled. By controlling the distance of the fluid flow path, the reaction system can be operated so that the high temperature flue gas is closer to the recycle compressor exit than the expander exit. Similarly, control of the valves can also cause the low temperature flue gas to be closer to the expander exit than the recycle compressor exit.

Figure 6:
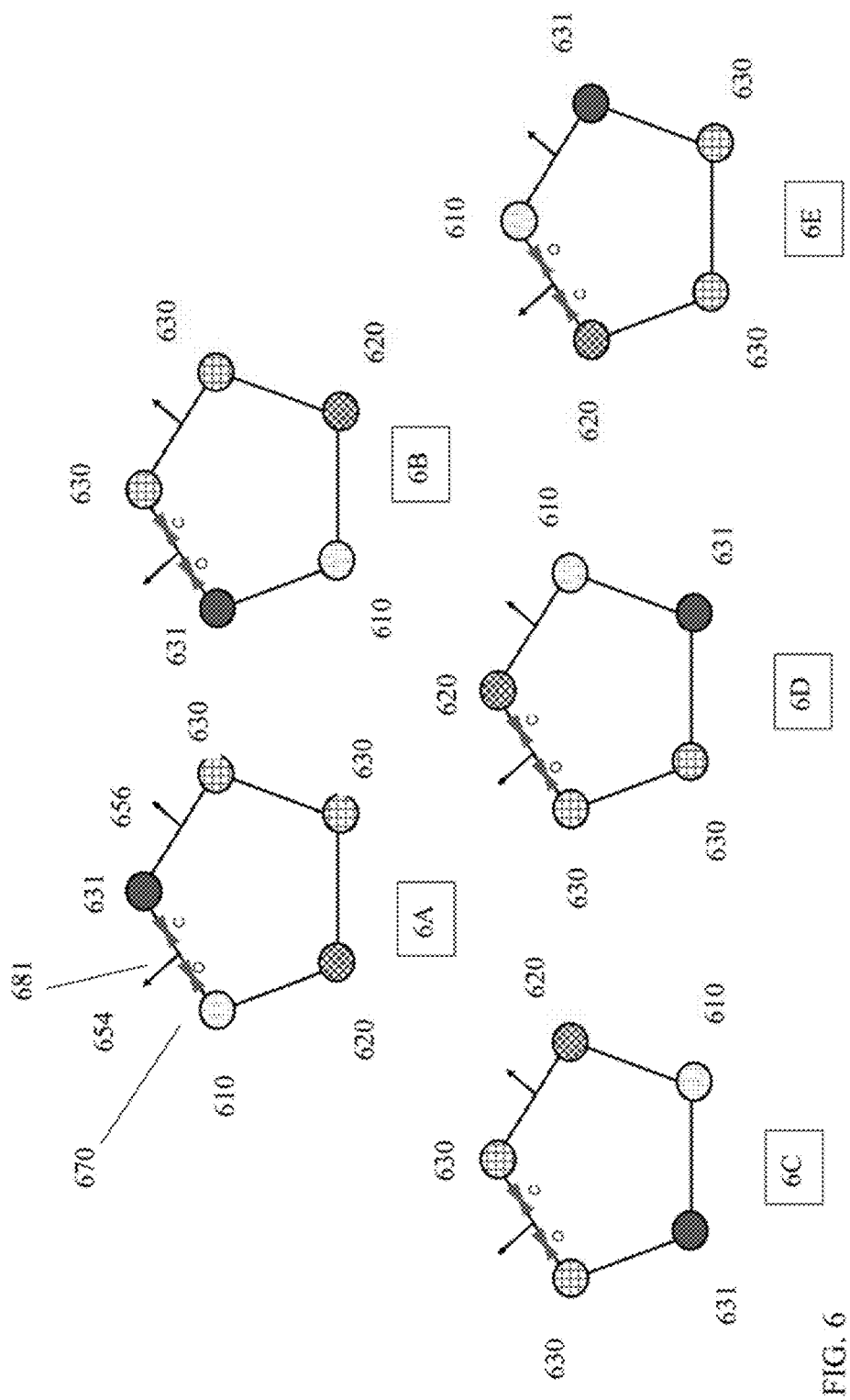
FIG. 6 shows an example of a manifold configuration for use with a plurality of reverse flow reactors.

FIG. 6 shows an example of how a ring manifold configuration can be operated to selectively use high temperature flue gas for recycle to the reactors. In FIG. 6, five different snapshots in time are shown. In each snapshot, one reactor corresponds to a reactor 620 which is exhausting high temperature flue gas during the regeneration step. In other words, reactor 620 is in the later portion of the regeneration step. Another reactor corresponds to a reactor 610 which is exhausting low temperature flue gas. The remaining reactors correspond to reactors that are either idle 631 or in the reaction step 630, and therefore not currently in fluid communication with the manifold. The identity of reactor 620 and reactor 610 changes in each snapshot due to the cyclic nature of the overall reaction, where the reactors switch from reaction to regeneration within each cycle. Because the identity of the reactors changes in each snapshot, each reactor is labeled in each snapshot. The remaining elements are only labeled in FIG. 6A.

FIG. 6A shows one of the snapshots of the manifold. In FIG. 6A, valve 670 is open, while valve 681 is closed. Because valve 670 is open, reactor 610 is closer to the expander outlet 654 than reactor 620. By contrast, because valve 681 is closed, the flow path from reactor 620 to recycle compressor outlet 656 is shorter than the flow path for reactor 610. Although some mixing of the flue gases from reactor 610 and reactor 620 may occur, the substantial portion of the gas that exits through expander outlet 654 will come from reactor 610, while the substantial portion of the gas that exits through recycle compressor outlet 656 will come from reactor 620. If desired, tracer gases could be used in combination with a detector (such as infrared spectroscopy or mass spectrometry) to determine the relative proportions of gas from reactor 610 and reactor 620 that leave the manifold through expander exit 654 and recycle compressor exit 656 under various pressure and flow rate conditions.

As the reaction cycle progresses, the identity of reactor 620 and reactor 610 will change, as one reactor finishes the regeneration cycle and another reactor enters the regeneration cycle. FIG. 6B shows the configuration after the shift in the identity of reactor 620 and reactor 610. Valve 670 remains open while valve 681 remains closed. As shown in FIG. 6B, the new location for reactor 620 still has a shorter fluid flow path to the recycle compressor outlet 656 than the new location for reactor 610, while reactor 610 has a shorter fluid flow path to expander outlet 654.

As the reaction cycle progresses further, the configuration can pass through states that correspond to FIG. 6C, FIG. 6D, and FIG. 6E. As shown in FIG. 6C and FIG. 6D, keeping valve 670 open and valve 681 closed maintains the desired manifold configuration of having the shortest fluid flow path between reactor 620 and the recycle compressor outlet 656 and the shortest fluid flow path between reactor 610 and expander outlet 654.

In FIG. 6E, the states of the valves are changed. In FIG. 6E, valve 671 is now closed, while valve 680 is open. It is noted that reactor 620 and reactor 610 are on opposite sides of closed valve 671 in FIG. 6E. This shift in the opened and closed valves allows the manifold configuration to remain in the desired condition, where the fluid flow path from reactor 620 to the recycle compressor outlet 656 is the shortest flow path, and the fluid flow path from reactor 610 to the expander exit is the shortest flow path.

Example of Reverse Flow Reactor Configuration

For endothermic reactions operated at elevated temperatures, such as hydrocarbon reforming, a reverse flow reactor can provide a suitable reaction environment for providing the heat for the endothermic reaction.

In a reverse flow reactor, the heat needed for an endothermic reaction may be provided by creating a high-temperature heat bubble in the middle of the reactor. A two-step process can then be used wherein heat is (a) added to the reactor bed(s) or monolith(s) via in-situ combustion, and then (b) removed from the bed in-situ via an endothermic process, such as reforming, pyrolysis, or steam cracking. This type of configuration can provide the ability to consistently manage and confine the high temperature bubble in a reactor region(s) that can tolerate such conditions long term. A reverse flow reactor system can allow the primary endothermic and regeneration processes to be performed in a substantially continuous manner.

As an example, a reverse flow reactor system can include first and second reactors, oriented in a series relationship with each other with respect to a common flow path, and optionally but preferably along a common axis. The common axis may be horizontal, vertical, or otherwise. In other examples, a reverse flow reactor system can correspond to a single reactor that includes both a reaction zone and a recuperation zone.

During a regeneration step, reactants (e.g., fuel and oxygen) are permitted to combine or mix in a reaction zone to combust therein, in-situ, and create a high temperature zone or heat bubble inside a middle portion of the reactor system. The heat bubble can correspond to a temperature that is at least about the initial temperature for the endothermic reaction. Typically, the temperature of the heat bubble can be greater than the initial temperature for the endothermic reaction, as the temperature will decrease as heat is transferred from the heat bubble in a middle portion of the reactor toward the ends of the reactor. In some aspects, the combining can be enhanced by a reactant mixer that mixes the reactants to facilitate substantially complete combustion/reaction at the desired location, with the mixer optionally located between the first and second reactors. The combustion process can take place over a long enough duration that the flow of first and second reactants through the first reactor also serves to displace a substantial portion, (as desired) of the heat produced by the reaction (e.g., the heat bubble), into and at least partially through the second reactor, but preferably not all of the way through the second reactor to reduce or minimize waste of heat and overheating the second reactor. This heat is transferred, for example, to one or more surfaces in the second reactor and/or in the reaction zone for the endothermic reaction in a reactor. The flue gas may be exhausted through the second reactor, but preferably most of the heat is retained within the second reactor. The amount of heat displaced into the second reactor during the regeneration step can also be limited or determined by the desired exposure time or space velocity that the hydrocarbon feed gas will have in the endothermic reaction environment. In aspects where a single reactor is used, the heat produced by the reaction can be displaced into and/or at least partially through the reaction zone of the reactor, but preferably the displacement can also reduce or minimize waste of heat due to exit of heated gas from the reactor.

After regeneration or heating the second reactor media (which can include and/or correspond to one or more surfaces including a catalyst for an endothermic reaction), in the next/reverse step or cycle, reactants for the endothermic reaction methane (and/or natural gas and/or another hydrocarbon) can be supplied or flowed through the second reactor, from the direction opposite the direction of flow during the heating step. For example, in a reforming process, methane (and/or natural gas and/or another hydrocarbon) can be supplied or flowed through the second reactor. The methane can contact the hot second reactor and mixer media, in the heat bubble region, to transfer the heat to the methane for reaction energy.

Figure 12:
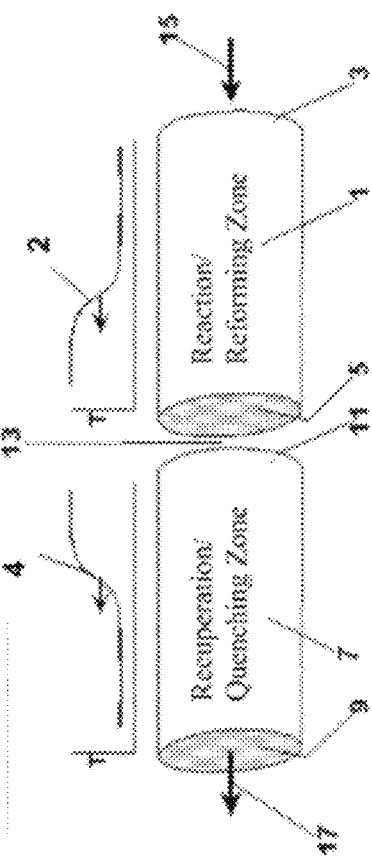
FIG. 12 schematically shows an example of operation of a reverse flow reactor.
Figure 12:
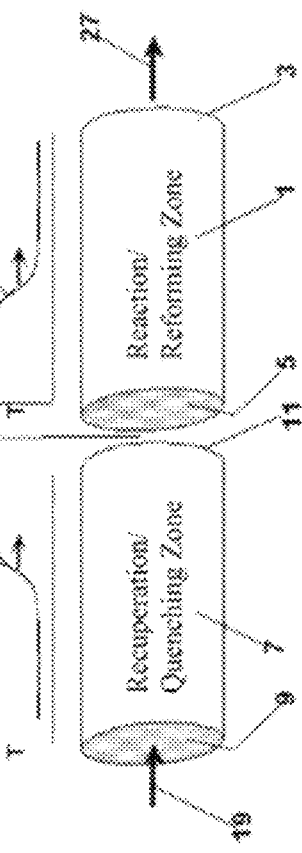

For some aspects, the basic two-step asymmetric cycle of a reverse flow regenerative bed reactor system is depicted in FIGS. 12A and 12B of FIG. 12 in terms of a reactor system having two zones/reactors; a first or recuperator/quenching zone (7) and a second or reaction zone (1). Both the reaction zone (1) and the recuperator zone (7) can contain regenerative monoliths and/or other regenerative structures formed from a doped ceramic composition. Regenerative monoliths or other regenerative structures, as used herein, comprise materials that are effective in storing and transferring heat as well as being effective for carrying out a chemical reaction. The regenerative monoliths and/or other structures can correspond to any convenient type of material that is suitable for storing heat, transferring heat, and catalyzing a reaction. Examples of structures can include bedding or packing material ceramic beads or spheres, ceramic honeycomb materials, ceramic tubes, extruded monoliths, and the like, provided they are competent to maintain integrity, functionality, and withstand long term exposure to temperatures in excess of 1200° C., or in excess of 1400° C., or in excess of 1600° C., which can allow for some operating margin. In some aspects, the catalytic ceramic monolith and/or other catalytic ceramic structure can be used without the presence of an additional washcoat.

To facilitate description of FIG. 12, the reactor is described herein with reference to a reforming reaction. It is understood that other convenient types of endothermic reactions can generally be performed using a reverse flow reactor, such as the reactor shown in FIG. 12.

As shown in FIG. 12B of FIG. 12, at the beginning of the "reaction" step of the cycle, a secondary end 5 of the reaction zone 1 (a.k.a. herein as the second reactor) can be at an elevated temperature as compared to the primary end 3 of the reaction zone 1, and at least a portion (including the first end 9) of the recuperator or quench zone 7 (a.k.a. herein as the first reactor), can be at a lower temperature than the reaction zone 1 to provide a quenching effect for the resulting product. In an aspect where the reactors are used to perform reverse flow reforming, a methane-containing reactant feed (or other hydrocarbon-containing reactant feed) can be introduced via a conduit(s) 15, into a primary end 3 of the reforming or reaction zone 1. In various aspects, the hydrocarbon-containing reactant feed can also contain $H_2O$, $CO_2$, or a combination thereof.

The feed stream from inlet(s) 15 can absorb heat from reaction zone 1 and endothermically react to produce the desired synthesis gas product. As this step proceeds, a shift in the temperature profile 2, as indicated by the arrow, can be created based on the heat transfer properties of the system. When the ceramic catalyst monolith/other catalyst structure is designed with adequate heat transfer capability, this profile can have a relatively sharp temperature gradient, which gradient can move across the reaction zone 1 as the reforming step proceeds. In some aspects, a sharper temperature gradient profile can provide for improved control over reaction conditions. In aspects where another type of endothermic reaction is performed, a similar shift in temperature profile can occur, so that a temperature gradient moves across reaction zone 1 as the reaction step proceeds.

The effluent from the reforming reaction, which can include unreacted feed components (hydrocarbons, $H_2O$, $CO_2$) as well as synthesis gas components, can exit the reaction zone 1 through a secondary end 5 at an elevated temperature and pass through the recuperator reactor 7, entering through a second end 11, and exiting at a first end 9. The recuperator 7 can initially be at a lower temperature than the reaction zone 1. As the products (and optionally unreacted feed) from the reforming reaction pass through the recuperator zone 7, the gas can be quenched or cooled to a temperature approaching the temperature of the recuperator zone substantially at the first end 9, which in some embodiments can be approximately the same temperature as the regeneration feed introduced via conduit 19 into the recuperator 7 during the second step of the cycle. As the reforming effluent is cooled in the recuperator zone 7, a temperature gradient 4 can be created in the zone's regenerative bed(s) and can move across the recuperator zone 7 during this step. The quenching can heat the recuperator 7, which can be cooled again in the second step to later provide another quenching service and to prevent the size and location of the heat bubble from growing progressively through the quench reactor 7. After quenching, the reaction gas can exit the recuperator at 9 via conduit 17 and can be processed for separation and recovery of the various components.

The second step of the cycle, referred to as the regeneration step, can then begin with reintroduction of the first and second regeneration reactants via conduit(s) 19. The first and second reactants can pass separately through hot recuperator 7 toward the second end 11 of the recuperator 7, where they can be combined for exothermic reaction or combustion in or near a central region 13 of the reactor system.

An example of the regeneration step is illustrated in FIG. 12B of FIG. 12. Regeneration can entail transferring recovered sensible heat from the recuperator zone 7 to the reaction zone 1 to thermally regenerate the reaction beds 1 for the subsequent reaction cycle. Regeneration gas/reactants can enter recuperator zone 7, such as via conduit(s) 19, and flow through the recuperator zone 7 and into the reaction zone 1. In doing so, the temperature gradients 6 and 8 may move across the beds as illustrated by the arrows on the exemplary graphs in FIG. 12B, similar to but in opposite directions to the graphs of the temperature gradients developed during the reaction cycle in FIG. 12A of FIG. 12. Fuel and oxidant reactants may combust at a region proximate to the interface 13 of the recuperator zone 7 and the reaction zone 1. The heat recovered from the recuperator zone together with the heat of combustion can be transferred to the reaction zone, thermally regenerating the regenerative reaction monoliths and/or beds 1 disposed therein.

In some aspects, several of the conduits within a channel may convey a mixture of first and second reactants, due at least in part to some mixing at the first end (17) of the first reactor. However, the numbers of conduits conveying combustible mixtures of first and second reactants can be sufficiently low such that the majority of the stoichiometrically reactable reactants will not react until after exiting the second end of the first reactor. The axial location of initiation of combustion or exothermic reaction within those conduits conveying a mixture of reactants can be controlled by a combination of temperature, time, and fluid dynamics. Fuel and oxygen usually require a temperature-dependent and mixture-dependent autoignition time to combust. Still though, some reaction may occur within an axial portion of the conduits conveying a mixture of reactants. However, this reaction can be acceptable because the number of channels having such reaction can be sufficiently small that there is only an acceptable or inconsequential level of effect upon the overall heat balance within the reactor. The design details of a particular reactor system can be selected so as to avoid mixing of reactants within the conduits as much as reasonably possible.

Figure 13:
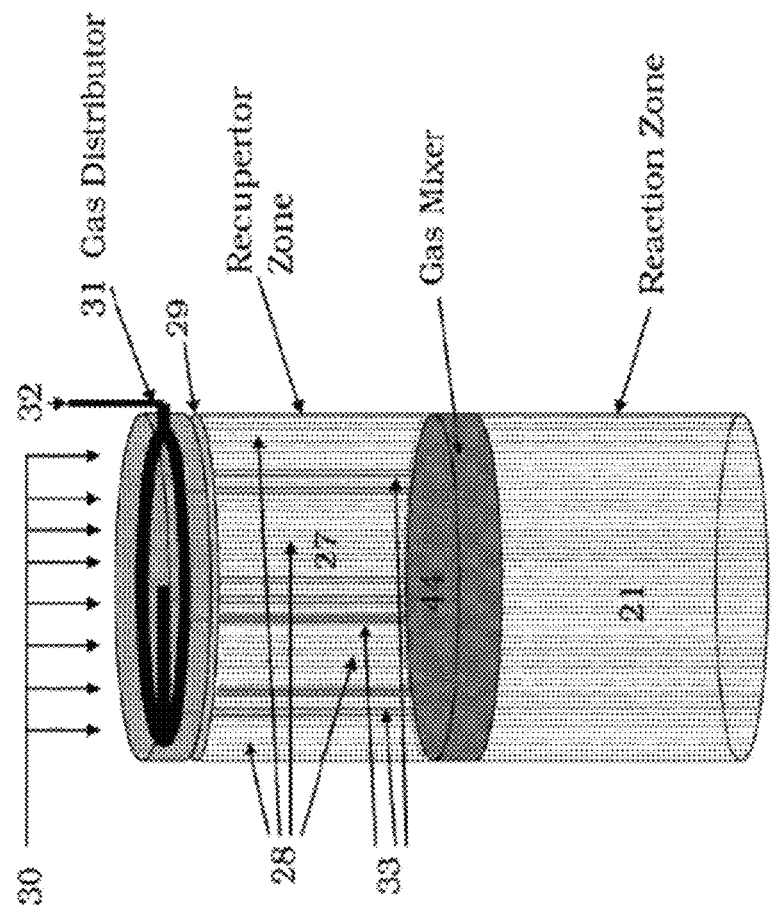
FIG. 13 schematically shows an example of a reverse flow reactor.

FIG. 13 illustrates another exemplary reactor system that may be suitable in some applications for controlling and deferring the combustion of fuel and oxidant to achieve efficient regeneration heat. FIG. 13 depicts a single reactor system, operating in the regeneration cycle. The reactor system may be considered as comprising two reactors zones. The recuperator 27 can be the zone primarily where quenching takes place and provides substantially isolated flow paths or channels for transferring both of the quenching reaction gases through the reactor media, without incurring combustion until the gasses arrive proximate or within the reactor core 13 in FIG. 12. The reformer 2 can be the reactor where regeneration heating and methane (and/or hydrocarbon) reformation primarily occurs, and may be considered as the second reactor for purposes herein. Although the first and second reactors in the reactor system are identified as separately distinguishable reactors, it is understood that the first and second reactors may be manufactured, provided, or otherwise combined into a common single reactor bed, whereby the reactor system might be described as comprising merely a single reactor that integrates both cycles within the reactor. The terms "first reactor" and "second reactor" can merely refer to the respective zones within the reactor system whereby each of the regeneration, reformation, quenching, etc., steps take place and do not require that separate components be utilized for the two reactors. However, various aspects can comprise a reactor system whereby the recuperator reactor includes conduits and channels as described herein, and the reformer reactor may similarly possess conduits. Additionally or alternately, some aspects may include a reformer reactor bed that is arranged different from and may even include different materials from, the recuperator reactor bed.

As discussed previously, the first reactor or recuperator 27 can include various gas conduits 28 for separately channeling two or more gases following entry into a first end 29 of the recuperator 27 and through the regenerative bed(s) disposed therein. A first gas 30 can enter a first end of a plurality of flow conduits 28. In addition to providing a flow channel, the conduits 28 can also comprise effective flow barriers (e.g., which effectively function such as conduit walls) to prevent cross flow or mixing between the first and second reactants and maintain a majority of the reactants effectively separated from each other until mixing is permitted. As discussed previously, each of the first and second channels can comprise multiple channels or flow paths. The first reactor may also comprise multiple substantially parallel flow segments, each comprising segregated first and second channels.

In some aspects, the recuperator can be comprised of one or more extruded honeycomb monoliths, as described above. Each monolith may provide flow channel(s) (e.g., flow paths) for one of the first or second reactants. Each channel preferably includes a plurality of conduits. Alternatively, a monolith may comprise one or more channels for each reactant with one or more channels or groups of conduits dedicated to flowing one or more streams of a reactant, while the remaining portion of conduits flow one or more streams of the other reactant. It is recognized that at the interface between channels, a number of conduits may convey a mixture of first and second reactant, but this number of conduits is proportionately small.

In aspects where a monolith is used, the monolith can have any convenient shape suitable for use as a catalytic surface. An example of a monolith can be an extruded honeycomb monolith. Honeycomb monoliths can be extruded structures that comprise many (e.g., a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square or hexagonal) cross-section and two- or three-dimensionally stacking such blocks above, behind, and beside each other. Monoliths can be attractive as reactor internal structures because they provide high heat transfer capacity with minimum pressure drop.

In some aspects, honeycomb monoliths can be characterized as having open frontal area (or geometric void volume) between 25% and 55%, and having conduit density between 50 and 2000 pores or cells per square inch (CPSI), or between 100 and 900 cells per square inch, or between 100 cells per square inch to 600 cells per square inch. For example, in one embodiment, the conduits may have a diameter/characteristic cell side length of only a few millimeters, such as on the order of roughly one millimeter. Reactor media components, such as the monoliths or alternative bed media, can provide for channels that include a packing with an average wetted surface area per unit volume that ranges from 50 $ft^{-1}$ to 3000 $ft^{-1}$ (~0.16 $km^{-1}$ to ~10 $km^{-1}$), or from 100 $ft^{-1}$ to 2500 $ft^{-1}$ (~0.32 $km^{-1}$ to ~8.2 $km^{-1}$), or from 200 $ft^{-1}$ to 2000 $ft^{-1}$ (~0.65 $km^{-1}$ to ~6.5 $km^{-1}$), based upon the volume of the first reactor that is used to convey a reactant. These relatively high surface area per unit volume values can aid in achieving a relatively quick change in the temperature through the reactor, such as generally illustrated by the relatively steep slopes in the exemplary temperature gradient profile graphs shown in FIG. 12A or 12B of FIG. 12.

Reactor media components can also provide for channels that include a packing that includes a high volumetric heat transfer coefficient (e.g., 0.02 $cal/cm^3$ s° C. or more, or 0.05 $cal/cm^3$ s° C. or more, or 0.10 $cal/cal/cm^3$ s° C. or more); that have low resistance to flow (low pressure drop); that have an operating temperature range consistent with the highest temperatures encountered during regeneration; that have high resistance to thermal shock; and/or that have high bulk heat capacity (e.g., 0.10 cal/cm$^3$ s° C. or more, or 0.20 cal/cm$^3$ s° C. or more). As with the high surface area values, these relatively high volumetric heat transfer coefficient values and/or other properties can aid in achieving a relatively quick change in the temperature through the reactor, such as generally illustrated by the relatively steep slopes in the exemplary temperature gradient profile graphs, such as in FIGS. 12A and 12B of FIG. 12. The cited values are averages based upon the volume of reactor used for conveyance of a reactant.

In various aspects, adequate heat transfer rate can be characterized by a heat transfer parameter, ΔTHT, below 500° C., or below 100° C., or below 50° C. The parameter ΔTHT, as used herein, is the ratio of the bed-average volumetric heat transfer rate that is needed for recuperation, to the volumetric heat transfer coefficient of the bed, hv. The volumetric heat transfer rate (e.g. cal/cm$^3$ sec) that is sufficient for recuperation can be calculated as the product of the gas flow rate (e.g. g/sec) with the gas heat capacity (e.g. cal/g° C.) and desired end-to-end temperature change (excluding any reaction, e.g. ° C.), and then this quantity can be divided by the volume (e.g. cm$^3$) of the reactor (or portion of a reactor) traversed by the gas. The volumetric heat transfer coefficient of the bed, hv, can typically be calculated as the product of an area-based coefficient (e.g. cal/cm$^2$ s° C.) and a specific surface area for heat transfer (av, e.g. cm$^2$/cm$^3$), often referred to as the wetted area of the packing.

In some aspects, a washcoat can be added to the formed, sintered ceramic composition prior to exposing the composition to a reducing environment to form dopant metal particles. A washcoat can allow the sintered ceramic composition to be impregnated with additional catalytic metal. Such additional catalytic metal can be the same as the dopant metal or different.

One option for incorporating an additional catalytic metal into a washcoat can be to impregnate a catalyst support with the additional catalytic metal, such as by impregnation via incipient wetness. The impregnation can be performed with an aqueous solution of suitable metal salt or other catalytic metal precursor, such as tetramineplatinum nitrate or rhodium nitrate hydrate. The impregnated support can then be dried and/or calcined for decomposition of the catalytic metal precursor. A variety of temperature profiles can potentially be used for the heating steps. One or more initial drying steps can be used for drying the support, such as heating at a temperature from 100° C. to 200° C. for 0.5 hours to 24 hours. A calcination to decompose the catalytic metal precursor compound can be at a temperature of 200° C. to 800° C. for 0.5 hours to 24 hours, depending on the nature of the impregnated catalytic metal compound. Depending on the precursor for the catalytic metal, the drying step(s) and/or the decomposing calcination step(s) can be optional. Examples of additional catalytic metals can include, but are not limited to, Ni, Co, Fe, Pd, Rh, Ru, Pt, Ir, Cu, Ag, Au, Zr, Cr, Ti, V, and combinations thereof.

Alternative embodiments may use reactor media other than monoliths, such as whereby the channel conduits/flow paths may include a more tortuous pathways (e.g. convoluted, complex, winding and/or twisted but not linear or tubular), including but not limited to labyrinthine, variegated flow paths, conduits, tubes, slots, and/or a pore structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperator 27. Such other types of reactor media can be suitable, so long as at least a portion of such media can be formed by sintering a ceramic catalytic composition as described herein, followed by exposing such media to reducing conditions to activate the catalyst. For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure.

In some aspects, the reverse flow reactor can include some type of equipment or method to direct a flow stream of one of the reactants into a selected portion of the conduits. In the exemplary embodiment of FIG. 13, a gas distributor 31 can direct a second gas stream 32 to second gas stream channels that are substantially isolated from or not in fluid communication with the first gas channels, here illustrated as channels 33. The result can be that at least a portion of gas stream 33 is kept separate from gas stream 30 during axial transit of the recuperator 27. In some aspects, the regenerative bed(s) and/or monolith(s) of the recuperator zone can comprise channels having a gas or fluid barrier that isolates the first reactant channels from the second reactant channels. Thereby, both of the at least two reactant gases that transit the channel means may fully transit the regenerative bed(s), to quench the regenerative bed, absorb heat into the reactant gases, before combining to react with each other in the combustion zone.

In various aspects, gases (including fluids) 30 and 32 can each comprise a component that reacts with a component in the other reactant 30 and 32, to produce an exothermic reaction when combined. For example, each of the first and second reactant may comprise one of a fuel gas and an oxidant gas that combust or burn when combined with the other of the fuel and oxidant. By keeping the reactants substantially separated, the location of the heat release that occurs due to exothermic reaction can be controlled. In some aspects "substantially separated" can be defined to mean that at least 50 percent, or at least 75 percent, or at least 90 percent of the reactant having the smallest or limiting stoichiometrically reactable amount of reactant, as between the first and second reactant streams, has not become consumed by reaction by the point at which these gases have completed their axial transit of the recuperator 27. In this manner, the majority of the first reactant 30 can be kept isolated from the majority of the second reactant 32, and the majority of the heat release from the reaction of combining reactants 30 and 32 can take place after the reactants begin exiting the recuperator 27. The reactants can be gases, but optionally some reactants may comprise a liquid, mixture, or vapor phase.

The percent reaction for these regeneration streams is meant the percent of reaction that is possible based on the stoichiometry of the overall feed. For example, if gas 30 comprised 100 volumes of air (80 volumes $N_2$ and 20 Volumes $O_2$), and gas 32 comprised 10 volumes of hydrogen, then the maximum stoichiometric reaction would be the combustion of 10 volumes of hydrogen ($H_2$) with 5 volumes of oxygen ($O_2$) to make 10 volumes of $H_2O$. In this case, if 10 volumes of hydrogen were actually combusted in the recuperator zone (27), this would represent 100% reaction of the regeneration stream. This is despite the presence of residual un-reacted oxygen, because in this example the un-reacted oxygen was present in amounts above the stoichiometric requirement. Thus, in this example the hydrogen is the stoichiometrically limiting component. Using this definition, less than 50% reaction, or less than 25% reaction, or less than 10% reaction of the regeneration streams can occur during the axial transit of the recuperator (27).

In various aspects, channels 28 and 33 can comprise ceramic (including zirconia), alumina, or other refractory material capable of withstanding temperatures exceeding 1200° C., or 1400° C., or 1600° C. Additionally or alternately, channels 28 and 33 can have a wetted area between 50 ft$^{-1}$ and 3000 ft$^{-1}$, or between 100 ft$^{-1}$ and 2500 ft$^{-1}$, or between 200 ft$^{-1}$ and 2000 ft$^{-1}$.

Referring again briefly to FIG. 12, the reactor system can include a first reactor 7 containing a first end 9 and a second end 11, and a second reactor 1 containing a primary end 3 and a secondary end 5. The embodiments illustrated in FIGS. 1 and 2 are merely simple illustrations provided for explanatory purposes only and are not intended to represent a comprehensive embodiment. Reference made to an "end" of a reactor merely refers to a distal portion of the reactor with respect to an axial mid-point of the reactor. Thus, to say that a gas enters or exits an "end" of the reactor, such as end 9, means merely that the gas may enter or exit substantially at any of the various points along an axis between the respective end face of the reactor and a mid-point of the reactor, but more preferably closer to the end face than to the mid-point. Thereby, one or both of the first and second reactant gases could enter at the respective end face, while the other is supplied to that respective end of the reactor through slots or ports in the circumferential or perimeter outer surface on the respective end of the reactor.

Process Example—Reverse Flow Reforming and Regeneration

An example of a reaction that can be performed in a reverse flow reactor system is reforming of hydrocarbons under steam reforming conditions in the presence of H$_2$O, under dry reforming conditions in the presence of CO$_2$, or under conditions where both H$_2$O and CO$_2$ are present in the reaction environment. As a general overview of operation during reforming in a swing reactor, such as a reverse flow reactor, a regeneration step or portion of a reaction cycle can be used to provide heat for the reactor. Reforming can then occur within the reactor during a reforming step or portion of the cycle, with the reforming reaction consuming heat provided during the reactor regeneration step. During reactor regeneration, fuel, oxidant, and a diluent are introduced into the reactor from a regeneration end of the reactor. The bed and/or monoliths in the regeneration portion of the reactor can absorb heat, but typically do not include a catalyst for reforming. As the fuel and oxidant pass through the regeneration section, heat is transferred from the regeneration section to the fuel and oxidant. Combustion does not occur immediately, but instead the location of combustion is controlled to occur in a middle portion of the reactor. The flow of the reactants continues during the regeneration step, leading to additional transfer of the heat generated from combustion into the reforming end of the reactor.

After a sufficient period of time, the combustion reaction is stopped. Any remaining combustion products and/or reactants can optionally be purged. The reforming step or portion of the reaction cycle can then start. The reactants for reforming can be introduced into the reforming end of the reactor, and thus flow in effectively the opposite direction relative to the flow during regeneration. The bed and/or monoliths in the reforming portion of the reactor can include a catalyst for reforming. In various aspects, at least a portion of the catalyst can correspond to a catalyst formed from a ceramic composition as described herein. As reforming occurs, the heat introduced into the reforming zone during combustion can be consumed by the endothermic reforming reaction. After exiting the reforming zone, the reforming products (and unreacted reactants) are no longer exposed to a reforming catalyst. As the reforming products pass through the regeneration zone, heat can be transferred from the products to the regeneration zone. After a sufficient period of time, the reforming process can be stopped, remaining reforming products can optionally be collected or purged from the reactor, and the cycle can start again with a regeneration step.

The reforming reaction performed within the reactor can correspond reforming of methane and/or other hydrocarbons using steam reforming, in the presence of H$_2$O; using dry reforming, in the presence of CO$_2$, or using "bi" reforming in the presence of both H$_2$O and CO$_2$. Examples of stoichiometry for steam, dry, and "bi" reforming of methane are shown in equations (1)-(3).

$$\text{Dry Reforming: } CH_4 + CO_2 = 2CO + 2H_2 \tag{1}$$

$$\text{Steam Reforming: } CH_4 + H_2O = CO + 3H_2 \tag{2}$$

$$\text{Bi Reforming: } 3CH_4 + 2H_2O + CO_2 = 4CO + 8H_2. \tag{3}$$

As shown in equations (1)-(3), dry reforming can produce lower ratios of H$_2$ to CO than steam reforming. Reforming reactions performed with only steam can generally produce a ratio of H$_2$ to CO of around 3, such as 2.5 to 3.5. By contrast, reforming reactions performed in the presence of CO$_2$ can generate much lower ratios, possibly approaching a ratio of H$_2$ to CO of roughly 1.0 or even lower. By using a combination of CO$_2$ and H$_2$O during reforming, the reforming reaction can potentially be controlled to generate a wide variety of H$_2$ to CO ratios in a resulting syngas.

It is noted that the ratio of H$_2$ to CO in a synthesis gas can also be dependent on the water gas shift equilibrium. Although the above stoichiometry shows ratios of roughly 1 or roughly 3 for dry reforming and steam reforming, respectively, the equilibrium amounts of H$_2$ and CO in a synthesis gas can be different from the reaction stoichiometry. The equilibrium amounts can be determined based on the water gas shift equilibrium, which relates the concentrations of H$_2$, CO, CO$_2$ and H$_2$O based on the reaction $$H_2O + CO \Longleftrightarrow H_2 + CO_2 \tag{4}$$

Most reforming catalysts, such as rhodium and/or nickel, can also serve as water gas shift catalysts. Thus, if reaction environment for producing H$_2$ and CO also includes H$_2$O and/or CO$_2$, the initial stoichiometry from the reforming reaction may be altered based on the water gas shift equilibrium. This equilibrium is also temperature dependent, with higher temperatures favoring production of CO and H$_2$O. It is noted that higher temperatures can also improve the rate for reaching equilibrium. As a result, the ability to perform a reforming reaction at elevated temperatures can potentially provide several benefits. For example, instead of performing steam reforming in an environment with excess H$_2$O, CO$_2$ can be added to the reaction environment. This can allow for both a reduction in the ratio of H$_2$ to CO produced based on the dry reforming stoichiometry as well as a reduction in the ratio of $H_2$ to CO produced based on the water gas shift equilibrium. Alternatively, if a higher $H_2$ to CO ratio is desired, $CO_2$ can be removed from the environment, and the ratio of $H_2O$ to $CH_4$ (or other hydrocarbons) can be controlled to produce a desirable type of synthesis gas. This can potentially allow for generation of a synthesis gas having a $H_2$ to CO ratio of 0.1 to 15, or 0.1 to 3.0, or 0.5 to 5.0, or 1.0 to 10, by selecting appropriate amounts of feed components.

The reforming reactions shown in equations (1)-(3) are endothermic reactions. One of the challenges in commercial scale reforming can be providing the heat for performing the reforming reaction in an efficient manner while reducing or minimizing introduction of additional components into the desired synthesis gas product. Cyclic reaction systems, such as reverse flow reactor systems, can provide heat in a desirable manner by having a cycle including a reforming step and a regeneration step. During the regeneration step, combustion can be performed within a selected area of the reactor. A gas flow during regeneration can assist with transferring this heat from the combustion zone toward additional portions of the reforming zone in the reactor. The reforming step within the cycle can be a separate step, so that incorporation of products from combustion into the reactants and/or products from reforming can be reduced or minimized. The reforming step can consume heat, which can reduce the temperature of the reforming zone. As the products from reforming pass through the reactor, the reforming products can pass through a second zone that lacks a reforming or water gas shift catalyst. This can allow the reaction products to cool prior to exiting the reactor. The heat transferred from the reforming products to the reactor can then be used to increase the temperature of the reactants for the next combustion or regeneration step.

One common source for methane is natural gas. In some applications, natural gas, including associated hydrocarbon and impurity gases, may be used as a feed for the reforming reaction. The supplied natural gas also may be sweetened and/or dehydrated natural gas. Natural gas commonly includes various concentrations of associated gases, such as ethane and other alkanes, preferably in lesser concentrations than methane. The supplied natural gas may include impurities, such as $H_2S$ and nitrogen. More generally, the hydrocarbon feed for reforming can include any convenient combination of methane and/or other hydrocarbons. Optionally, the reforming feed may also include some hydrocarbonaceous compounds, such as alcohols or mercaptans, which are similar to hydrocarbons but include one or more heteroatoms different from carbon and hydrogen. In some aspects, an additional component present in the feed can correspond to impurities such as sulfur that can adsorb to the catalytic monolith during a reducing cycle (such as a reforming cycle). Such impurities can be oxidized in a subsequent cycle to form sulfur oxide, which can then be reduced to release additional sulfur-containing components (or other impurity-containing components) into the reaction environment.

In some aspects, the feed for reforming can include, relative to a total weight of hydrocarbons in the feed for reforming, 5 wt % or more of $C_{2+}$ compounds, such as ethane or propane, or 10 wt % or more, or 15 wt % or more, or 20 wt % or more, such as up to 50 wt % or possibly still higher. It is noted that nitrogen and/or other gases that are non-reactive in a combustion environment, such as $H_2O$ and $CO_2$, may also be present in the feed for reforming. In aspects where the reformer corresponds to an on-board reforming environment, such non-reactive products can optionally be introduced into the feed, for example, based on recycle of an exhaust gas into the reformer. Additionally or alternately, the feed for reforming can include 40 wt % or more methane, or 60 wt % or more, or 80 wt % or more, or 95 wt % or more, such as having a feed that is substantially composed of methane (98 wt % or more). In aspects where the reforming corresponds to steam reforming, a molar ratio of steam molecules to carbon atoms in the feed can be 0.3 to 4.0. It is noted that methane has 1 carbon atom per molecule while ethane has 2 carbon atoms per molecule. In aspects where the reforming corresponds to dry reforming, a molar ratio of $CO_2$ molecules to carbon atoms in the feed can be 0.05 to 3.0.

Within the reforming zone of a reverse flow reactor, the temperature can vary across the zone due to the nature of how heat is added to the reactor and/or due to the kinetics of the reforming reaction. The highest temperature portion of the zone can typically be found near a middle portion of the reactor. This middle portion can be referred to as a mixing zone where combustion is initiated during regeneration. At least a portion of the mixing zone can correspond to part of the reforming zone if a monolith with reforming catalyst extends into the mixing zone. As a result, the location where combustion is started during regeneration can typically be near to the end of the reforming zone within the reactor. It is noted that the location of combustion catalyst within the reactor(s) can overlap with the location of reforming catalyst within the reactor(s), so that some portions of the reactor(s) can correspond to both combustion zone and reaction zone. Moving from the center of the reactor to the ends of the reactor, the temperature can decrease. As a result, the temperature at the beginning of the reforming zone (at the end of the reactor) can be cooler than the temperature at the end of the reforming zone (in the middle portion of the reactor).

As the reforming reaction occurs, the temperature within the reforming zone can be reduced. The rate of reduction in temperature can be related to the kinetic factors of the amount of available hydrocarbons for reforming and/or the temperature at a given location within the reforming zone. As the reforming feed moves through the reforming zone, the reactants in the feed can be consumed, which can reduce the amount of reforming that occurs at downstream locations. However, the increase in the temperature of the reforming zone as the reactants move across the reforming zone can lead to an increased reaction rate.

At roughly 500° C., the reaction rate for reforming can be sufficiently reduced that little or no additional reforming will occur. As a result, in some aspects as the reforming reaction progresses, the beginning portion of the reforming zone can cool sufficiently to effectively stop the reforming reaction within a portion of the reforming zone. This can move the location within the reactor where reforming begins to a location that is further downstream relative to the beginning of the reforming zone. When a sufficient portion of the reforming zone has a temperature below 500° C., or below 600° C., the reforming step within the reaction cycle can be stopped to allow for regeneration. Alternatively, based on the amount of heat introduced into the reactor during regeneration, the reforming portion of the reaction cycle can be stopped based on an amount of reaction time, so that the amount of heat consumed during reforming (plus heat lost to the environment) is roughly in balance with the amount of heat added during regeneration. After the reforming process is stopped, any remaining synthesis gas product still in the reactor can optionally be recovered prior to starting the regeneration step of the reaction cycle.

The regeneration process can then be initiated. During regeneration, a fuel such as methane, natural gas, or $H_2$, and oxygen can be introduced into the reactor and combusted. The location where the fuel and oxidant are allowed to mix can be controlled in any convenient manner, such as by introducing the fuel and oxidant via separate channels. By delaying combustion during regeneration until the reactants reach a central portion of the reactor, the non-reforming end of the reactor can be maintained at a cooler temperature. This can also result in a temperature peak in a middle portion of the reactor. The temperature peak can be located within a portion of the reactor that also includes the reforming catalyst. During a regeneration cycle, the temperature within the reforming reactor can be increased sufficiently to allow for the reforming during the reforming portion of the cycle. This can result in a peak temperature within the reactor of 1100° C. or more, or 1200° C. or more, or 1300° C. or more, or potentially a still higher temperature. The pressure in the reactor during regeneration can be a convenient pressure, such as a pressure ranging from ambient (~0 kPa-g) up to roughly 15 MPa-g.

The relative length of time and reactant flow rates for the reforming and regeneration portions of the process cycle can be selected to balance the heat provided during regeneration with the heat consumed during reforming. For example, one option can be to select a reforming step that has a similar length to the regeneration step. Based on the flow rate of hydrocarbons, $H_2O$, and/or $CO_2$ during the reforming step, an endothermic heat demand for the reforming reaction can be determined. This heat demand can then be used to calculate a flow rate for combustion reactants during the regeneration step. Of course, in other aspects the balance of heat between reforming and regeneration can be determined in other manners, such as by determining desired flow rates for the reactants and then selecting cycle lengths so that the heat provided by regeneration balances with the heat consumed during reforming.

In addition to providing heat, the reactor regeneration step during a reaction cycle can also allow for coke removal from the catalyst within the reforming zone. In various aspects, one or more types of catalyst regeneration can potentially occur during the regeneration step. One type of catalyst regeneration can correspond to removal of coke from the catalyst. During reforming, a portion of the hydrocarbons introduced into the reforming zone can form coke instead of forming CO or $CO_2$. This coke can potentially block access to the catalytic sites (such as metal sites) of the catalyst. In some aspects, the rate of formation can be increased in portions of the reforming zone that are exposed to higher temperatures, such as portions of the reforming zone that are exposed to temperatures of 800° C. or more, or 900° C. or more, or 1000° C. or more. During a regeneration step, oxygen can be present as the temperature of the reforming zone is increased. At the temperatures achieved during regeneration, at least a portion of the coke generated during reforming can be removed as CO or $CO_2$.

Due to the variation in temperature across the reactor, several options can be used for characterizing the temperature within the reactor and/or within the reforming zone of the reactor. One option for characterizing the temperature can be based on an average bed or average monolith temperature within the reforming zone. In practical settings, determining a temperature within a reactor requires the presence of a measurement device, such as a thermocouple. Rather than attempting to measure temperatures within the reforming zone, an average (bed or monolith) temperature within the reforming zone can be defined based on an average of the temperature at the beginning of the reforming zone and a temperature at the end of the reforming zone. Another option can be to characterize the peak temperature within the reforming zone after a regeneration step in the reaction cycle. Generally, the peak temperature can occur at or near the end of the reforming zone, and may be dependent on the location where combustion is initiated in the reactor. Still another option can be to characterize the difference in temperature at a given location within the reaction zone at different times within a reaction cycle. For example, a temperature difference can be determined between the temperature at the end of the regeneration step and the temperature at the end of the reforming step. Such a temperature difference can be characterized at the location of peak temperature within the reactor, at the entrance to the reforming zone, at the exit from the reforming zone, or at any other convenient location.

In various aspects, the reaction conditions for reforming hydrocarbons can include one or more of an average reforming zone temperature ranging from 400° C. to 1200° (or more); a peak temperature within the reforming zone of 800° C. to 1500° C.; a temperature difference at the location of peak temperature between the end of a regeneration step and the end of the subsequent reforming step of 25° C. or more, or 50° C. or more, or 100° C. or more, or 200° C. or more, such as up to 800° C. or possibly still higher; a temperature difference at the entrance to the reforming zone between the end of a regeneration step and the end of the subsequent reforming step of 25° C. or more, or 50° C. or more, or 100° C. or more, or 200° C. or more, such as up to 800° C. or possibly still higher; and/or a temperature difference at the exit from the reforming zone between the end of a regeneration step and the end of the subsequent reforming step of 25° C. or more, or 50° C. or more, or 100° C. or more, or 200° C. or more, such as up to 800° C. or possibly still higher.

With regard to the average reforming zone temperature, in various aspects the average temperature for the reforming zone can be 500° C. to 1500° C., or 400° C. to 1200° C., or 800° C. to 1200° C., or 400° C. to 900° C., or 600° C. to 1100° C., or 500° C. to 1000° C. Additionally or alternately, with regard to the peak temperature for the reforming zone (likely corresponding to a location in the reforming zone close to the location for combustion of regeneration reactants), the peak temperature can be 800° C. to 1500° C., or 1000° C. to 1400° C., or 1200° C. to 1500° C., or 1200° C. to 1400° C.

Additionally or alternately, the reaction conditions for reforming hydrocarbons can include a pressure of 0 psig to 1500 psig (10.3 MPa), or 0 psig to 1000 psig (6.9 MPa), or 0 psig to 550 psig (3.8 MPa); and a gas hourly space velocity of reforming reactants of 1000 $hr^{-1}$ to 50,000 $hr^{-1}$. The space velocity corresponds to the volume of reactants relative to the volume of monolith per unit time. The volume of the monolith is defined as the volume of the monolith as if it was a solid cylinder.

In some aspects, an advantage of operating the reforming reaction at elevated temperature can be the ability to convert substantially all of the methane and/or other hydrocarbons in a reforming feed. For example, for a reforming process where water is present in the reforming reaction environment (i.e., steam reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %

In other aspects, for a reforming process where carbon dioxide is present in the reforming reaction environment (i.e., dry reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %.

In some alternative aspects, the reforming reaction can be performed under dry reforming conditions, where the reforming is performed with $CO_2$ as a reagent but with a reduced or minimized amount of $H_2O$ in the reaction environment. In such alternative aspects, a goal of the reforming reaction can be to produce a synthesis gas with a $H_2$ to CO ratio of 1.0 or less. In some aspects, the temperature during reforming can correspond to the temperature ranges described for steam reforming. Optionally, in some aspects a dry reforming reaction can be performed at a lower temperature of between 500° C. to 700° C., or 500° C. to 600° C. In such aspects, the ratio of $H_2$ to CO can be 0.3 to 1.0, or 0.3 to 0.7, or 0.5 to 1.0. Performing the dry reforming reaction under these conditions can also lead to substantial coke production, which can require removal during regeneration in order to maintain catalytic activity.

Examples—Impact of Modifying Flue Gas Exit Temperatures

A pilot scale reactor was used to investigate the impact and benefits of modifying flue gas exit temperatures on operation of a reverse flow reactor system. The examples provided herein correspond to results from a single reactor, but those of skill in the art will readily understand the application of the following results to reaction systems including plurality of reverse flow reactors.

One potential issue with selectively recycling high temperature flue gas is whether the increase in the input temperature of the recycle gas could alter the temperature profile within the reactor. To investigate this, steam reforming was performed in the pilot scale reactor using representative steam reforming conditions, with three different temperatures for the input gas flow. The input gas temperatures corresponded to 180° C., 240° C., and 280° C.

Figure 7:
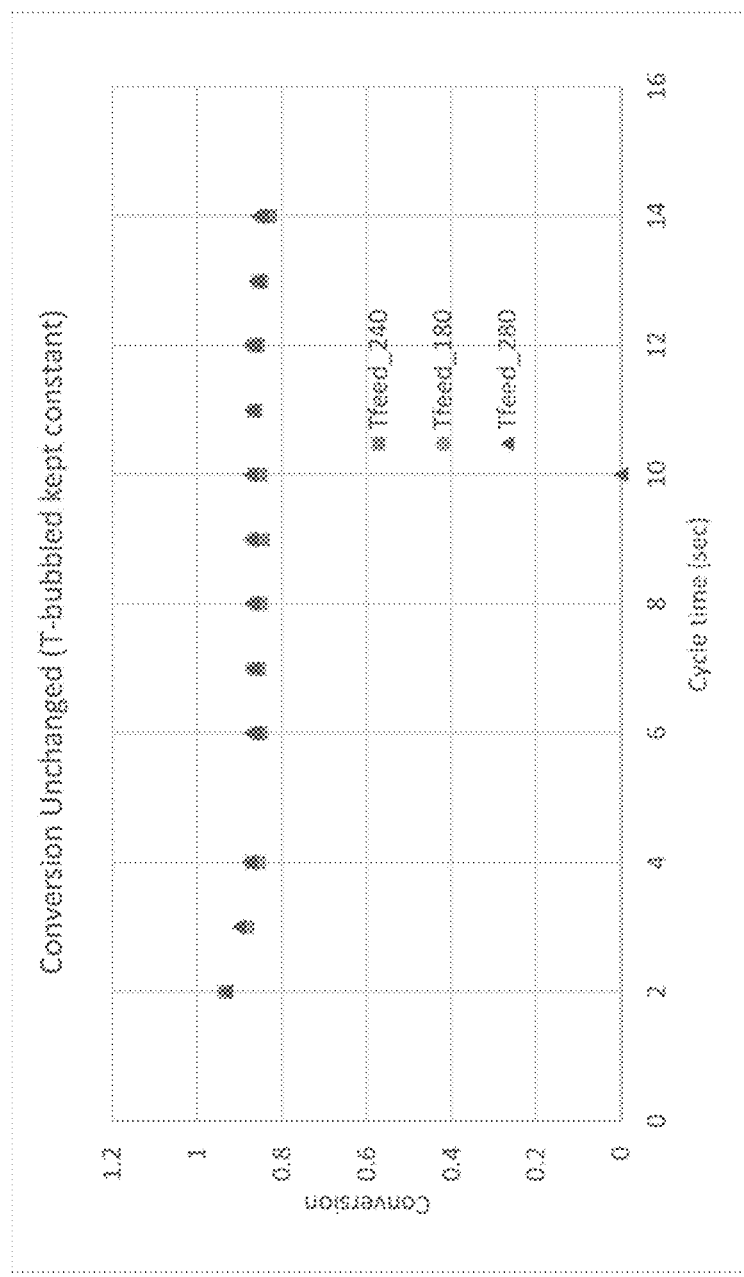
FIG. 7 shows conversion during a reforming cycle with various regeneration inlet temperatures.
Figure 8:
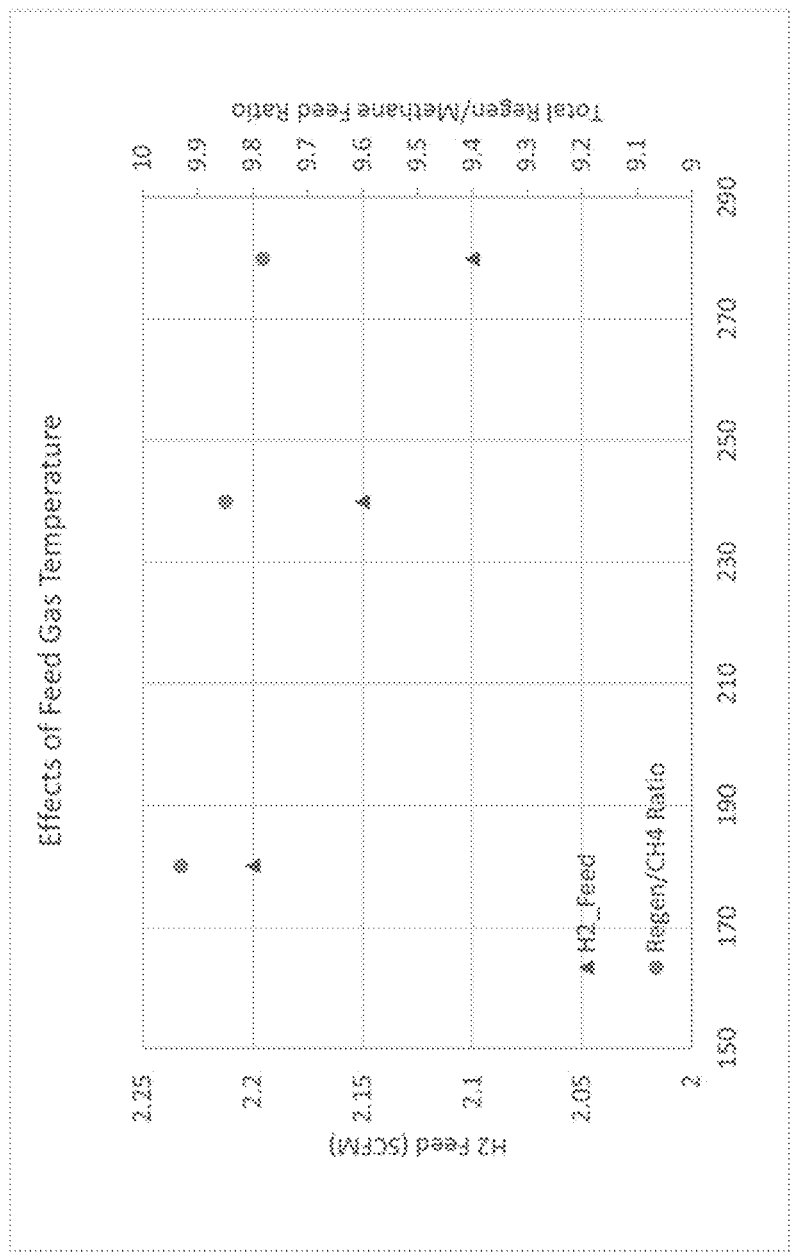
FIG. 8 shows hydrogen production and fuel consumption during a reforming cycle with various regeneration inlet temperatures.
Figure 9:
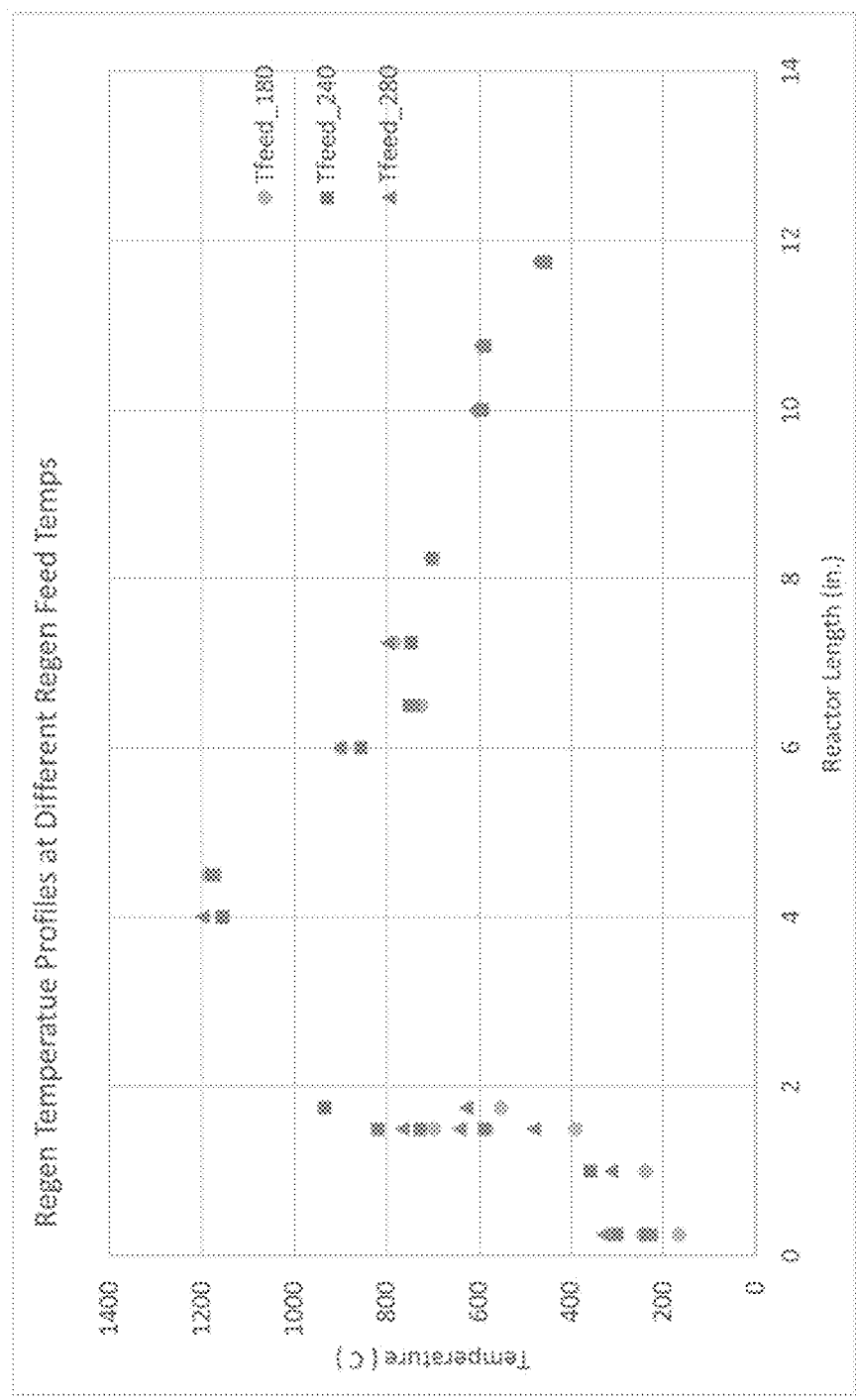
FIG. 9 shows temperature profiles for a reverse flow reactor during a reforming cycle with various regeneration inlet temperatures.

FIGS. 7-9 show the results from the investigation. FIG. 7 shows the amount of methane conversion during steam reforming as a function of cycle length for each of the three inlet gas temperatures. As shown in FIG. 7, the conversion percentage for the methane was substantially the same at each inlet gas temperature. It is believed that the results in FIG. 7 would be similar at substantially higher inlet gas temperatures, such as inlet gas temperatures of 400° C. or more, or 500° C. or more, such as up to 700° C. or possibly still higher.

FIG. 8 shows how the gas composition during regeneration changes with inlet feed temperature. In FIG. 8, the left axis corresponds to the amount of $H_2$ (orange dots) that was needed to achieve the target temperature profile in the reactor. The right axis (blue dots) corresponds to a ratio of the gas flow during the regeneration step versus the methane flow during the reforming step. As shown in FIG. 8, the amount of hydrogen required to achieve the desired temperature profile was reduced as the inlet gas temperature was increased. The reduced amount of hydrogen fuel during regeneration contributed to the lower total flow required during the regeneration step to convert the methane flow during the reforming step.

Based on FIGS. 7 and 8, increasing the inlet gas temperature during regeneration allowed the conversion rate of methane during steam reforming to be maintained while using less fuel and less gas flow during the regeneration step. FIG. 9 shows the temperature profiles that were produced within the reactor for each inlet gas temperature. As shown in FIG. 9, the temperature profile was substantially similar for each inlet gas temperature. Thus, FIGS. 7-9 demonstrate that increasing the inlet gas temperature during regeneration can allow substantially the same temperature profile and reaction conditions to be achieved at a lower fuel cost. This increase in inlet gas temperature can be achieved by segregating available flue gas so that high temperature flue gas is preferentially recycled for use as the inlet gas during regeneration.

Figure 10:
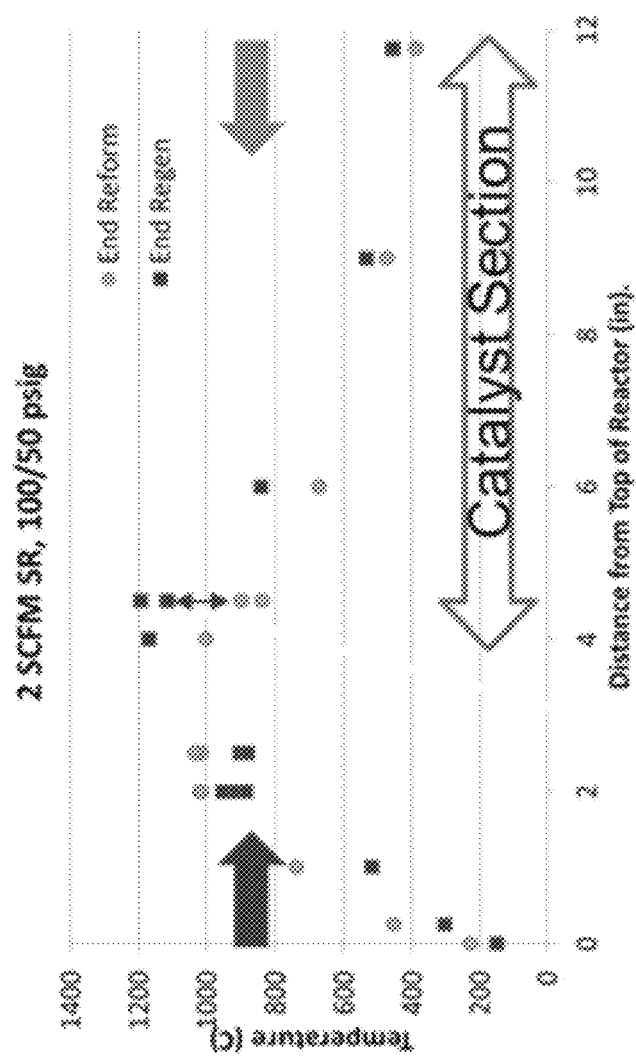
FIG. 10 shows a temperature profile relative to location within a reactor during a reforming cycle with a regeneration flue gas exit temperature of less than 500° C.
Figure 11:
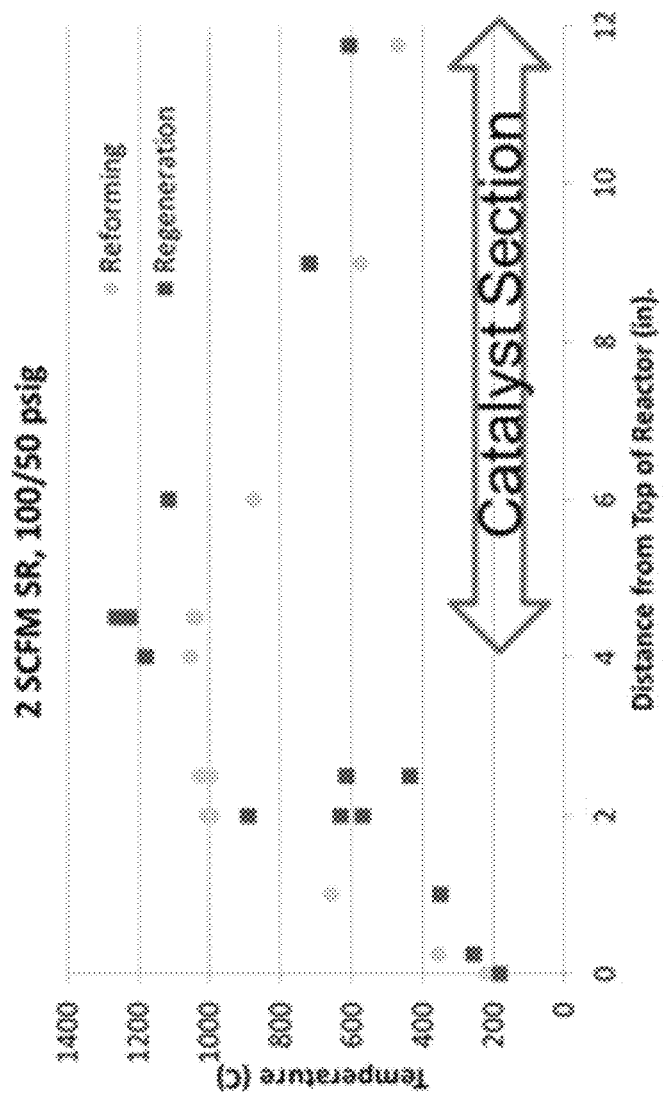
FIG. 11 shows a temperature profile relative to location within a reactor during a reforming cycle with a regeneration flue gas exit temperature of greater than 500° C.

FIGS. 7-9 demonstrate that substantially the same desired reaction conditions can be achieved during the reaction step at various temperature values for the inlet gas during the regeneration step. FIGS. 10 and 11 further demonstrate the benefits that can be achieved by varying the inlet gas temperature.

FIG. 10 shows the temperature profile from performing steam reforming in the reactor with a flue gas exhaust temperature of roughly 450° C., while FIG. 11 shows results from performing steam reforming with a flue gas exhaust of roughly 600° C. The temperature profiles are shown at both the end of the regeneration step and the end of the reaction (reforming) step. The temperature profiles are plotted relative to distance from the top of the reactor.

As shown in FIG. 10 and FIG. 11, the temperature profiles in FIGS. 10 and 11 are similar in the region between 0 inches-4 inches in the reactor. This corresponds to the portion of the reactor that is closest to where the regeneration gas flow is introduced into the reactor. However, the catalyst section where reforming occurs within the reactor corresponds to the region between roughly 4 inches and 12 inches. In this portion of the reactor, having a higher flue gas exit temperature results in a higher temperature at the end of the regeneration step and at the end of the reforming step at each location sampled within the reactor.

The differences in the temperature profiles in FIG. 10 and FIG. 11 illustrates the benefits of operating at a higher flue gas exit temperature. In the region between 0 inches and 4 inches, the temperature profile is constrained based on the limits of the structural materials used for the reactor. Because temperatures substantially above 1200° C. are not desirable, the amount of fuel that can be combusted per unit time during regeneration is constrained. Thus, similar temperature profiles near the top of the reactor were obtained at either flue gas exit temperature. However, further down the reactor where the catalyst is located, the constraint of limiting the flue gas exhaust temperature to a temperature of roughly 450° C. resulted in a limit on the temperature profile in the region between 4 inches and 12 inches in the reactor. When the constraint on the flue gas exhaust temperature was relaxed to allow an exit temperature of roughly 600° C., a corresponding increase in temperature was observed across the catalyst region.

FIG. 10 and FIG. 11 show the difference in temperature profile within the reactor when operating the reactor to have a flue gas exit temperature of 450° C. versus 600° C. Table 1 shows the regeneration input flows that were used to produce the temperature profiles shown in FIG. 10 and FIG. 11.

TABLE 1

Reforming Results Versus Regeneration Exhaust Temperature

| Values correspond to standard cubic feet per minute | FIG. 10 T profiles | FIG. 11 T profiles |
|---|---|---|
| Air | 3.2 | 5.7 |
| $N_2$ | 7.2 | 10.9 |
| $H_2$ | 1.1 | 1.9 |
| Total Flow | 11.5 | 18.5 |
| XH2 | 0.1 | 0.1 |
| Average Conversion | 52% | 76% |

As shown in Table 1, in order to achieve the regeneration temperature profile in FIG. 11, an increased amount of gas flow was used during the regeneration step relative to the input gas flow for FIG. 10. It is noted that a small excess of $H_2$ was included in the gas flow (XH2) relative to the stoichiometric combustion amount. The increased flow to achieve the temperature profile in FIG. 11 included increasing the amount of $H_2$, therefore allowing more heat to be added to the reactor during regeneration. This additional heat allowed for a substantial increase in the amount of methane converted during the reforming portion of the reaction cycle, from 52% conversion to 76% conversion. It is noted that for the purpose of this example, the temperature profiles were selected to have less than 90% conversion, so that the benefits of increasing the flue gas exhaust temperature would be clear. In other aspects, increases in the flue gas exhaust temperature can be used with reforming conditions that result in 90% or more conversion of methane and/or other hydrdocarbons. In such a situation where the conversion is already relatively high, increasing the amount of heat available in the reactor can allow for reforming of an increased amount of methane and/or other hydrocarbons.

Additional Embodiments

Embodiment 1. A method for operating a plurality of reactors, comprising: reacting a first mixture comprising fuel and 0.1 vol % or more of $O_2$ under first combustion conditions in a first combustion zone within a first reactor to form a first flue gas comprising a first temperature of 400° C. or more, and to heat one or more surfaces in a first reaction zone to a regenerated surface temperature of 800° C. or more, the first reaction zone comprising a catalyst composition; passing at least a portion of the first flue gas into a second reactor; reacting a second mixture comprising fuel, 0.1 vol % or more of $O_2$, and the at least a portion of the first flue gas under second combustion conditions in a second combustion zone within the second reactor to form a second flue gas having a temperature of between 200° C. to the first temperature, and to heat one or more surfaces in a second reaction zone; exposing a first reactant stream to the one or more surfaces in the first reaction zone to increase the temperature of the first reactant stream; and exposing the first reactant stream to the catalyst composition in the first reaction zone at a temperature of 800° C. or more to form a first product stream, a direction of flow for the first reactant stream within the first reaction zone being reversed relative to a direction of flow for the first mixture, wherein the first combustion conditions comprise a first pressure and the second combustion conditions comprise a second pressure, the first pressure being greater than the second pressure by 100 kPa or more.

Embodiment 2. The method of Embodiment 1, wherein the at least a portion of the first flue gas is cascaded into the second reactor.

Embodiment 3. The method of any of the above claims, wherein after the reacting the second mixture in the second reactor, the method further comprises: reacting a third mixture comprising fuel and 0.1 vol % or more of $O_2$ under first combustion conditions in a second combustion zone within the second reactor to form a third flue gas comprising the first temperature, and to heat the second reaction zone to the regenerated surface temperature, the second reaction zone comprising a catalyst composition; passing at least a portion of the third flue gas into an additional reactor; reacting a fourth mixture comprising fuel, 0.1 vol % or more of $O_2$, and the at least a portion of the third flue gas under second combustion conditions in an additional combustion zone within the additional reactor to form an additional flue gas having a temperature of between 200° C. to the first temperature, and to heat one or more surfaces in a second reaction zone; after the reacting of the third mixture, exposing a second reactant stream to the catalyst composition in the second reaction zone at the regenerated surface temperature to form a second product stream, a direction of flow for the second reactant stream within the second reaction zone being reversed relative to a direction of flow for the third mixture, wherein the first combustion conditions comprise a first pressure and the second combustion conditions comprise a second pressure, the first pressure being greater than the second pressure by 100 kPa or more, the third mixture optionally comprising substantially the same composition as the first mixture.

Embodiment 4. A method for operating a plurality of reactors, comprising: reacting a first mixture comprising fuel and 0.1 vol % or more of $O_2$ under first combustion conditions in a first combustion zone within a first reactor to form a first flue gas comprising a first temperature of 400° C. or more, and to heat one or more surfaces in a first reaction zone to a regenerated surface temperature of 800° C. or more, the first reaction zone comprising a catalyst composition; cascading at least a portion of the first flue gas into a second reactor; reacting a second mixture comprising fuel, 0.1 vol % or more of $O_2$, and the at least a portion of the first flue gas under second combustion conditions in a second combustion zone within the second reactor to form a second flue gas having a temperature of between 200° C. to the first temperature, and to heat one or more surfaces in a second reaction zone; exposing a first reactant stream to the one or more surfaces in the first reaction zone to increase the temperature of the first reactant stream; and exposing the first reactant stream to the catalyst composition in the first reaction zone at a temperature of 800° C. or more to form a first product stream, a direction of flow for the first reactant stream within the first reaction zone being reversed relative to a direction of flow for the first mixture.

Embodiment 5. The method of Embodiment 4, wherein the first combustion conditions comprise a first pressure and the second combustion conditions comprise a second pressure, the first pressure being greater than the second pressure by 100 kPa or more.

Embodiment 6. The method of any of the above embodiments, further comprising passing at least a portion of the second flue gas into the first reactor.

Embodiment 7. The method of any of the above embodiments, wherein the catalyst composition comprises a reforming catalyst, wherein the first reactant stream comprises a reformable hydrocarbon and steam, and wherein the first product stream comprises hydrogen, the reformable hydrocarbon optionally comprising methane.

Embodiment 8. The method of any of the above embodiments, wherein the first reactor and the second reactor comprise reverse flow reactors.

Embodiment 9. A system comprising a plurality of reverse flow reactors, comprising: a first reverse flow reactor comprising a first recycle gas inlet and a first flue gas outlet; and one or more second reverse flow reactors comprising one or more second recycle gas inlets and one or more second flue gas outlets, the one or more second recycle gas inlets being in direct fluid communication with the first flue gas outlet, the first recycle gas inlet being in indirect fluid communication with at least one second recycle gas outlet.

Embodiment 10. The system of Embodiment 9, wherein the first reverse flow reactor and the one or more second reverse flow reactors comprise a combustion zone and a reaction zone, the reaction zone optionally comprising a reforming catalyst.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for operating a plurality of reactors, comprising:
reacting a first mixture comprising fuel and 0.1 vol % or more of $O_2$ under first combustion conditions in a first combustion zone within a first reactor to form a first flue gas comprising a first temperature of 400° C. or more, and to heat one or more surfaces in a first reaction zone to a regenerated surface temperature of 800° C. or more, the first reaction zone comprising a catalyst composition;
passing at least a portion of the first flue gas into a second reactor;
reacting a second mixture comprising fuel, 0.1 vol % or more of $O_2$, and the at least a portion of the first flue gas under second combustion conditions in a second combustion zone within the second reactor to form a second flue gas having a temperature between 200° C. and the first temperature, and to heat one or more surfaces in a second reaction zone; exposing a first reactant stream to the one or more surfaces in the first reaction zone to increase the temperature of the first reactant stream; and
exposing the first reactant stream to the catalyst composition in the first reaction zone at a temperature of 800° C. or more to form a first product stream, a direction of flow for the first reactant stream within the first reaction zone being reversed relative to a direction of flow for the first mixture,
wherein the first combustion conditions comprise a first pressure and the second combustion conditions comprise a second pressure, the first pressure being greater than the second pressure by 100 kPa or more.

2. The method of claim 1, wherein the first reactor is in direct fluid communication with the second reactor, and wherein the at least a portion of the first flue gas is cascaded into the second reactor.

3. The method of claim 1, further comprising passing at least a portion of the second flue gas into the first reactor.

4. The method of claim 1, wherein after the reacting the second mixture in the second reactor, the method further comprises:
reacting a third mixture comprising fuel and 0.1 vol % or more of $O_2$ under first combustion conditions in a second combustion zone within the second reactor to form a third flue gas comprising the first temperature, and to heat the second reaction zone to the regenerated surface temperature, the second reaction zone comprising a catalyst composition;
passing at least a portion of the third flue gas into an additional reactor;
reacting a fourth mixture comprising fuel, 0.1 vol % or more of $O_2$, and the at least a portion of the third flue gas under second combustion conditions in an additional combustion zone within the additional reactor to form an additional flue gas having a temperature of between 200° C. to the first temperature, and to heat one or more surfaces in a second reaction zone;
after the reacting of the third mixture, exposing a second reactant stream to the catalyst composition in the second reaction zone at the regenerated surface temperature to form a second product stream, a direction of flow for the second reactant stream within the second reaction zone being reversed relative to a direction of flow for the third mixture,
wherein the first combustion conditions comprise a first pressure and the second combustion conditions comprise a second pressure, the first pressure being greater than the second pressure by 100 kPa or more.

5. The method of claim 4, wherein the third mixture comprises substantially the same composition as the first mixture.

6. The method of claim 1, wherein the catalyst composition comprises a reforming catalyst, wherein the first reactant stream comprises a reformable hydrocarbon and steam, and wherein the first product stream comprises hydrogen.

7. The method of claim 1, wherein the reformable hydrocarbon comprises methane.

8. The method of claim 1, wherein the first reactor and the second reactor comprise reverse flow reactors.

9. A method for operating a plurality of reactors, comprising:
reacting a first mixture comprising fuel and 0.1 vol % or more of $O_2$ under first combustion conditions in a first combustion zone within a first reactor to form a first flue gas comprising a first temperature of 400° C. or more, and to heat one or more surfaces in a first reaction zone to a regenerated surface temperature of 800° C. or more, the first reaction zone comprising a catalyst composition;
cascading at least a first portion of the first flue gas into a second reactor without substantially altering the pressure, temperature, or composition of the at least a first portion of the first flue gas;
reacting a second mixture comprising fuel, 0.1 vol % or more of $O_2$, and the at least a portion of the first flue gas under second combustion conditions in a second combustion zone within the second reactor to form a second flue gas having a temperature between 200° C. and the first temperature, and to heat one or more surfaces in a second reaction zone;
exposing a first reactant stream to the one or more surfaces in the first reaction zone to increase the temperature of the first reactant stream; and exposing the first reactant stream to the catalyst composition in the first reaction zone at a temperature of 800° C. or more to form a first product stream, a direction of flow for the first reactant stream within the first reaction zone being reversed relative to a direction of flow for the first mixture.

10. The method of claim 9, wherein the first combustion conditions comprise a first pressure and the second combustion conditions comprise a second pressure, the first pressure being greater than the second pressure by 100 kPa or more.

11. The method of claim 9, further comprising passing at least a portion of the second flue gas into the first reactor.

12. The method of claim 9, the method further comprising cascading at least a second portion of the first flue gas into a third reactor without substantially altering the pressure, temperature, or composition of the at least a second portion of the first flue gas.

13. The method of claim 1, wherein the catalyst composition comprises a reforming catalyst, wherein the first reactant stream comprises a reformable hydrocarbon and steam, and wherein the first product stream comprises hydrogen.

14. The method of claim 13, wherein the reformable hydrocarbon comprises methane.

15. A system comprising a plurality of reverse flow reactors, comprising:
- a first reverse flow reactor comprising a first recycle gas inlet and a first flue gas outlet; and
- one or more second reverse flow reactors comprising one or more second recycle gas inlets and one or more second flue gas outlets, the one or more second recycle gas inlets being in direct fluid communication with the first flue gas outlet, the first recycle gas inlet being in indirect fluid communication with at least one second recycle gas outlet.

16. The system of claim 15, wherein the first reverse flow reactor and the one or more second reverse flow reactors comprise a combustion zone and a reaction zone, the reaction zone comprising a reforming catalyst.

* * * * *